(12) United States Patent
Jeong et al.

(10) Patent No.: US 11,132,886 B2
(45) Date of Patent: Sep. 28, 2021

(54) DISPLAY DEVICE

(71) Applicant: LG ELECTRONICS INC., Seoul (KR)

(72) Inventors: Hyo Jeong Jeong, Seoul (KR); Yoon Suk Jang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/783,801

(22) Filed: Feb. 6, 2020

(65) Prior Publication Data

US 2021/0166547 A1 Jun. 3, 2021

(30) Foreign Application Priority Data

Dec. 3, 2019 (KR) .................. 10-2019-0159268

(51) Int. Cl.
G08B 1/08 (2006.01)
G08B 21/18 (2006.01)
G09G 5/00 (2006.01)
H04W 4/02 (2018.01)
H04W 76/30 (2018.01)
G08B 3/10 (2006.01)
G08B 7/06 (2006.01)
G08B 5/36 (2006.01)

(52) U.S. Cl.
CPC .......... *G08B 21/182* (2013.01); *G09G 5/006* (2013.01); *H04W 4/023* (2013.01); *H04W 76/30* (2018.02); *G08B 3/10* (2013.01); *G08B 5/36* (2013.01); *G08B 7/06* (2013.01); *G09G 2330/027* (2013.01)

(58) Field of Classification Search
CPC .......... G08B 21/182; G08B 3/10; G08B 5/36; G08B 7/06; H04W 76/30; H04W 4/023; G09G 5/006; G09G 2330/027
USPC ..................................... 340/539.13
See application file for complete search history.

(56) References Cited

U.S. PATENT DOCUMENTS

| 10,685,621 | B1* | 6/2020 | Kline ................ G09G 3/20 |
| 2013/0141331 | A1* | 6/2013 | Shiu ................ G09G 5/003 345/158 |
| 2014/0282044 | A1* | 9/2014 | Oztaskent ............ G08C 23/04 715/740 |
| 2015/0264168 | A1* | 9/2015 | Kawaguchi ........... H04W 68/00 455/418 |
| 2017/0103735 | A1* | 4/2017 | Oh .................... G06F 1/1601 |
| 2017/0212653 | A1* | 7/2017 | Kanojia ............. H04L 43/0894 |
| 2017/0244574 | A1* | 8/2017 | Moon ................ H04L 41/0883 |
| 2017/0357473 | A1* | 12/2017 | Kim .................... G06F 1/1681 |
| 2018/0232120 | A1* | 8/2018 | Son .................... G06F 3/04883 |

(Continued)

FOREIGN PATENT DOCUMENTS

WO WO-2017094926 A1 * 6/2017 ......... G06F 3/04883

*Primary Examiner* — Zhen Y Wu
(74) *Attorney, Agent, or Firm* — Birch, Stewart, Kolasch & Birch, LLP

(57) ABSTRACT

A display device including a housing; a rollable display included in the housing; a wireless communication unit connected to an access point (AP); a motion recognition sensor configured to detect a user's motion; and a controller configured to determine if an external device is connected to the AP to which the wireless communication unit is connected, and output an alarm in response to the detection of the user's motion and the determination the external device is connected to the AP.

18 Claims, 24 Drawing Sheets

(56) References Cited

U.S. PATENT DOCUMENTS

| | | | |
|---|---|---|---|
| 2018/0262793 A1* | 9/2018 | Lau | H04N 21/2187 |
| 2018/0301124 A1* | 10/2018 | Oh | G09G 5/14 |
| 2018/0329514 A1* | 11/2018 | Kwon | G06F 3/03 |
| 2018/0348881 A1* | 12/2018 | Chung | G06F 3/04883 |
| 2018/0373804 A1* | 12/2018 | Zhang | G06F 3/0485 |
| 2020/0029167 A1* | 1/2020 | Bostick | H04R 1/1083 |
| 2020/0112763 A1* | 4/2020 | Chu | H04N 21/4344 |
| 2020/0226971 A1* | 7/2020 | Yi | G06F 3/011 |
| 2021/0136188 A1* | 5/2021 | Lei | H04M 1/026 |

* cited by examiner

FIG. 13
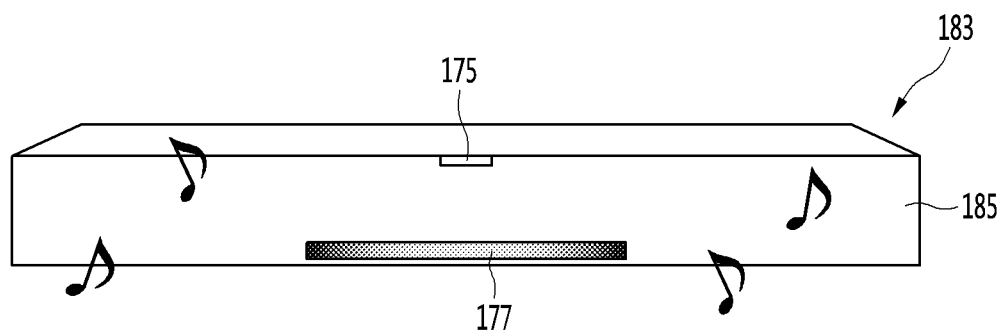
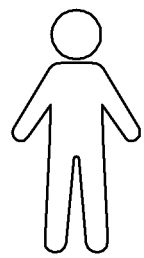

FIG. 23
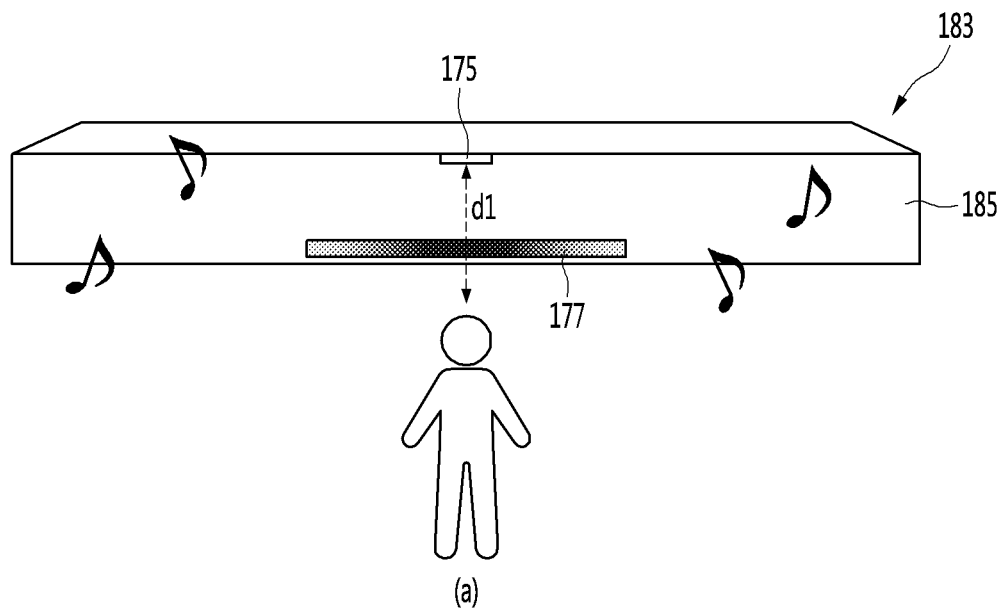
(a)
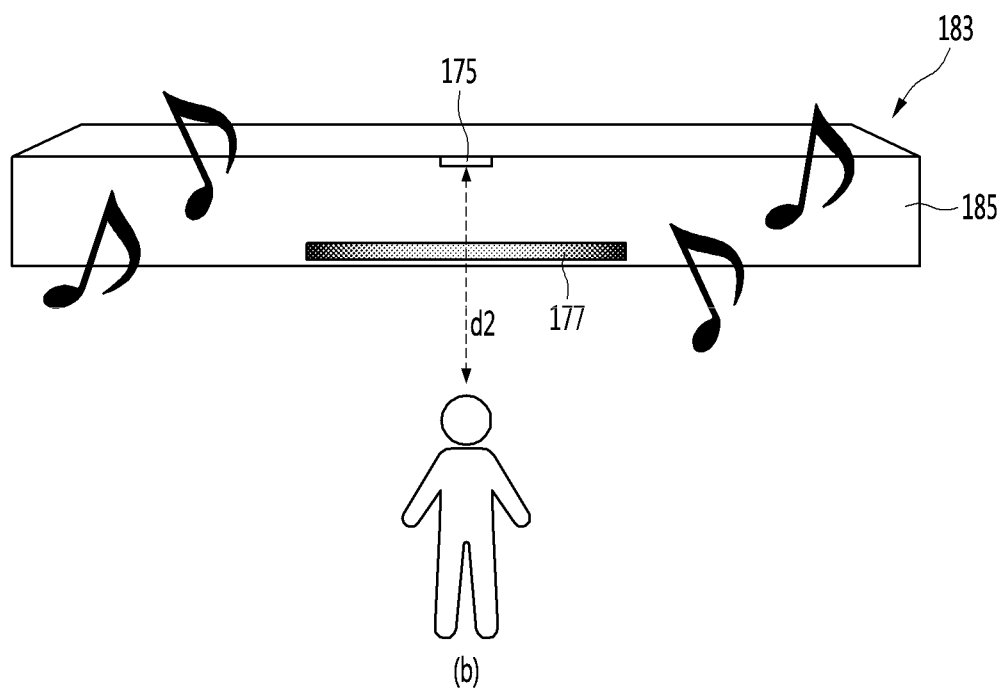
(b)

DISPLAY DEVICE

CROSS-REFERENCE TO RELATED APPLICATIONS

Pursuant to 35 U.S.C. § 119(a), this application claims the benefit of an earlier filing date and priority to Korean Application No. 10-2019-0159268 filed in the Republic of Korea on Dec. 3, 2019, the contents of which are incorporated by reference herein in its entirety.

BACKGROUND OF THE INVENTION

Field of the Invention

The present disclosure relates to a display device, and more particularly, to a display device including a flexible display.

Discussion of the Related Art

A display device has a function of receiving, processing, and displaying an image to be watched by a user. For example, the display device receives a broadcast signal selected by a user among broadcast signals transmitted from a broadcasting station, separates an image signal from the received signal, and re-displays the separated image signal on a display.

Recently, by virtue of development of broadcasting technology and network technology, a function of a display device has been significantly diversified and accordingly the performance of the device has also been enhanced. That is, the display device has developed to provide various different contents as well as simply broadcast content to a user. For example, the display device may provide gameplay, listening to music, Internet shopping, user customized information, or the like using various applications as well as programs received from a broadcasting station. In order to perform such extended functions, the display device is basically connected to other devices or networks using various communication programs and provides a ubiquitous computing environment to a user. That is, the display device has evolved to a smart device for achieving connectivity to a network and ubiquitous computing.

Recently, a flexible display that is capable of being deformed due to sufficient elasticity has been developed. The flexible display is capable of being deformed to be rolled into a body of the display device.

The display device may include the above flexible display and may include a rollable display that is partially drawn out of the display by a different degree by winding or unwinding the rollable display in a direction guided by a guide bar. Due to use of the rollable display, the display device can have a relatively compact structure.

Accordingly, in the display device, the entire display area thereof may be drawn out to display content or only part of the display area may be drawn out to display content. In addition, the display area of the display device may be entirely drawn into a housing so that the display device may only serve as a speaker. However, when the entire display area of the display device is drawn in the housing, it may be difficult for the user to know what state the display device is in.

SUMMARY OF THE INVENTION

Accordingly, one aspect of the present disclosure is directed to providing a display device capable of guiding a state thereof to a user when the user is detected. In particular, the present disclosure is directed to providing a display device capable of guiding a state thereof to a user when a display area is entirely drawn in a housing.

Another aspect of the present disclosure is directed to providing a display device capable of guiding the presence of an external device that may interwork with the display device to a user.

Another aspect of the present disclosure is directed to providing a display device for displaying information required by a user when the user is present near the display device.

Another aspect of the present disclosure is directed to providing a display device with improved accuracy of user recognition.

A display device according to an embodiment of the present disclosure comprises a display, a wireless communication unit connected to an access point (AP), a motion recognition sensor configured to detect a user's motion, and a controller configured to output an alarm if the user's motion is detected and an external device connected to the same AP to which the wireless communication unit is connected is recognized.

According to the present disclosure, the display device provides user convenience by informing the user of the state of the display device without a user's separate request. In particular, since the display device informs the user about the state of the display device operable when the entire display area is drawn in the housing, thereby minimizing user inconvenience.

According to the present disclosure, by detecting the presence of the user through whether or not connected to the same AP, not Bluetooth connection, the presence of the user can be more accurately recognized. In addition, the display device can minimize the case where the alarm is unnecessary output, by more accurately recognizing the presence of the user.

Further, the display device limits the maximum number of alarm outputs, thereby minimizing user inconvenience due to excessive alarms. In particular, the display device can output the alarm only during a time zone in which the user is active, by limiting the maximum number of alarm outputs with respect to the last alarm output time.

In addition, the display device can provide various information required for the user when the user exists. The display device can also decrease the magnitude of the alarm if the user is located too close, and increase the magnitude of the alarm if the user is far away, thereby minimizing a case where the user does not hear the alarm. Thus, the display device minimizes unnecessary power consumption when there is no user.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 13 is a view illustrating a method of outputting an alarm by a display device according to an embodiment of the present disclosure.

FIG. 23 is a view illustrating a method of adjusting a magnitude of an alarm according to a distance to a user by a display device according to the present disclosure.

DETAILED DESCRIPTION OF THE EMBODIMENTS

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. May be used herein to describe various elements, these elements should not be limited by these terms. These terms are generally only used to distinguish one element from another. When an element is referred to as being "connected with" another element, the element may be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

The display device described in this specification refers to a TV, a smart TV, a network TV, a hybrid broadcast broadband television (HBBTV), an Internet TV, a web TV, an Internet protocol television (IPTV), digital signage, a desktop computer, a smartphone, a laptop computer, a digital broadcast terminal, a personal digital assistant (PDA), a portable multimedia player (PMP), a navigation system, a slate PC, a tablet PC, an ultrabook, a wearable device, etc. Including a rollable display. Here, rollable display means that a display may be rolled in the form of a roll and may include a flexible display, a foldable display, etc.

Figure 1:
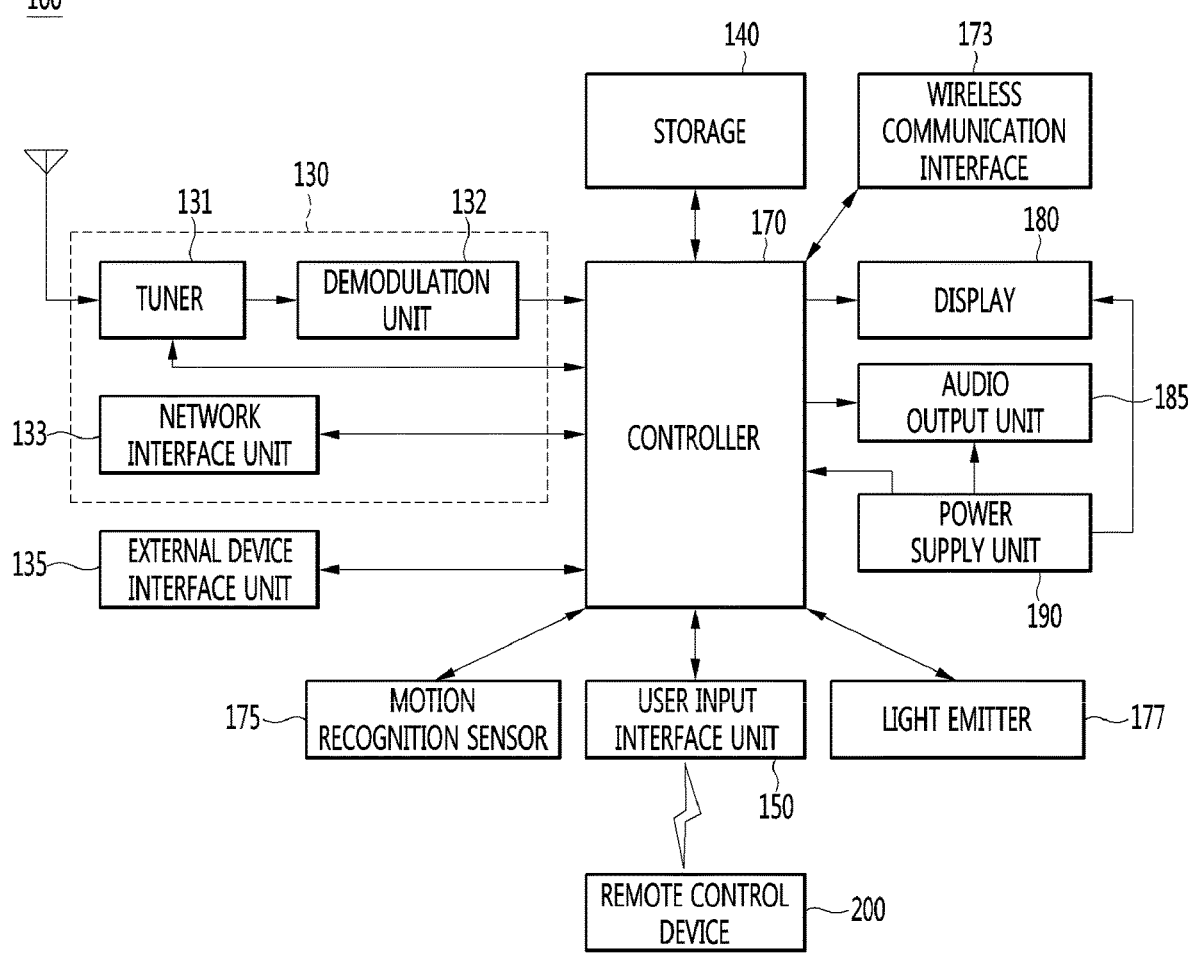
FIG. 1 is a block view illustrating a configuration of a display device according to an embodiment of the present disclosure.

FIG. 1 is a block view illustrating a configuration of a display device according to an embodiment of the present disclosure. Referring to FIG. 1, a display device 100 may include a broadcast reception unit 130, an external device interface unit 135, a storage unit 140, a user input interface unit 150, a controller 170, a wireless communication unit 173, a motion recognition sensor 175, a light emitter 177, a display 180, an audio output unit 185, and a power supply unit 190.

The broadcast reception unit 130 may include a tuner 131, a demodulation unit 132, and a network interface unit 133. The tuner 131 can select a specific broadcast channel according to a channel selection command. The tuner 131 can receive broadcast signals for the selected specific broadcast channel.

In addition, the demodulation unit 132 can divide the received broadcast signals into video signals, audio signals, and broadcast program related data signals and restore the divided video signals, audio signals, and data signals to an output available form.

The network interface unit 133 can provide an interface for connecting the display device 100 to a wired/wireless network including internet network. The network interface unit 133 can transmit or receive data to or from another user or another electronic device through an accessed network or another network linked to the accessed network.

The network interface unit 133 can also transmit or receive data to or from another user or another electronic device through an accessed network or another network linked to the accessed network. Further, the network interface unit 133 can access a predetermined webpage through an accessed network or another network linked to the accessed network. That is, it can transmit or receive data to or from a corresponding server by accessing a predetermined webpage through network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an internet or content provider or a network operator. Further, the network interface unit 133 can select and receive a desired application among applications open to the air, through network.

The external device interface unit 135 can receive an application or an application list in an adjacent external device and deliver it to the controller 170 or the storage unit 140. Also, the external device interface 135 can provide a connection path between the display device 100 and an external device. The external device interface 135 can receive at least one of image and audio output from an external device that is wirelessly or wiredly connected to the display device 100 and deliver it to the controller. The external device interface unit 135 may include a plurality of external input terminals. For example, the plurality of external input terminals may include an RGB terminal, at least one High Definition Multimedia Interface (HDMI) terminal, and a component terminal.

The storage unit 140 can store signal-processed image, voice, or data signals stored by a program in order for each signal processing and control in the controller 170. Additionally, the storage unit 140 can perform a function for temporarily store image, voice, or data signals output from the external device interface unit 135 or the network interface unit 133 and can store information on a predetermined image through a channel memory function. The storage unit 140 can also store an application or an application list input from the external device interface unit 135 or the network interface unit 133.

Further, the display device 100 can play content files (for example, video files, still image files, music files, document files, application files, and so on) stored in the storage unit 140 and provide them to a user.

Also, the user input interface unit 150 can deliver signals input from a user to the controller 170 or deliver signals from the controller 170 to a user. For example, the user input interface unit 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface unit 150 can deliver, to the controller 170, control signals input from local keys such as a power key, a channel key, a volume key, and a setting key.

Image signals that are image-processed in the controller 170 can be input to the display 180 and displayed as an image corresponding to corresponding image signals. Additionally, image signals that are image-processed in the controller 170 can be input to an external output device through the external device interface unit 135.

Voice signals processed in the controller 170 can be output to the audio output unit 185. The audio output unit 185 may be a speaker. Additionally, voice signals processed in the controller 170 can be input to an external output device through the external device interface unit 135.

Further, the control module 170 can control overall operations in the display device 100. Additionally, the controller 170 can control the display device 100 by a user command or internal program input through the user input interface unit 150 and download a desired application or application list into the display device 100 in access to network.

The controller 170 can output channel information selected by a user together with processed image or voice signals through the display 180 or the audio output unit 185. Additionally, according to an external device image playback command received through the user input interface unit 150, the controller 170 can output image signals or voice signals of an external device such as a camera or a camcorder, which are input through the external device interface unit 135, through the display 180 or the audio output unit 185.

Further, the controller 170 can control the display 180 to display images and control broadcast images input through the tuner 131, external input images input through the external device interface unit 135, images input through the network interface unit, or images stored in the storage unit 140 to be displayed on the display 180. In this instance, an image displayed on the display 180 may be a still image or video and also may be a 2D image or a 3D image.

Additionally, the controller 170 can play content stored in the display device 100, received broadcast content, and external input content input from the outside, and the content may be in various formats such as broadcast images, external input images, audio files, still images, accessed web screens, and document files.

Further, the wireless communication unit 173 can perform a wired or wireless communication with an external electronic device. The wireless communication unit 173 can perform short-range communication with an external device. For this, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication unit 173. Accordingly, a user of the wearable device can use the data processed in the display device 100 through the wearable device.

The motion recognition sensor 175 can detect a user's motion. The motion recognition sensor 175 can detect a motion generated near the display device 100. According to a first embodiment, the motion recognition sensor 175 can be configured as a radar. Also, the radar can detect a motion by radiating electromagnetic waves and subsequently receiving reflected electromagnetic waves. The radar can detect whether a motion is generated near the display device 100.

According to a second embodiment, the motion recognition sensor 175 can be configured as a camera. The camera can capture an image near the display device 100 and the controller 170 can detect a motion by analyzing the captured image.

Further, the embodiments described above are merely examples for convenience of description, and the motion recognition sensor 175 can detect a motion in various ways through various components. In addition, the first and second embodiments described above can be implemented separately or in combination.

In addition, the light emitter 177 can emit predetermined light to the outside. For example, the light emitter 177 can be an LED bar including at least one LED. The display 180 can convert image signals, data signals, or OSD signals, which are processed in the controller 170, or images signals or data signals, which are received in the external device interface unit 135, into R, G, and B signals to generate driving signals.

The display 180 can include a rollable display. In particular, the rollable display can refer to a display that is retracted into a housing 183 (and is wound around a guide bar 184 or is drawn out from the housing 183 and is unwound from the guide bar 184 (refer to FIG. 5).

The display device 100 can include the rollable display. A region, in which content is displayed, can increase or decrease according to withdrawal or insertion of the rollable display. The below-described display 180 can include the rollable display.

Furthermore, the display device 100 shown in FIG. 1 is just an embodiment of the present disclosure and thus, some of the components shown can be integrated, added, or omitted according to the specification of the actually implemented display device 100. That is, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface unit 133 or the external device interface unit 135 and play them without including the tuner 131 and the demodulation unit 132. For example, the display device 100 can be divided into an image processing device such as a set-top box for receiving broadcast signals or contents according to various network services and a content playback device for playing contents input from the image processing device.

In this instance, an operating method of a display device according to an embodiment of the present disclosure described below can be performed by one of the display device described with reference to FIG. 1, an image processing device such as the separated set-top box, and a content playback device including the display 180 and the audio output unit 185.

Figure 2:
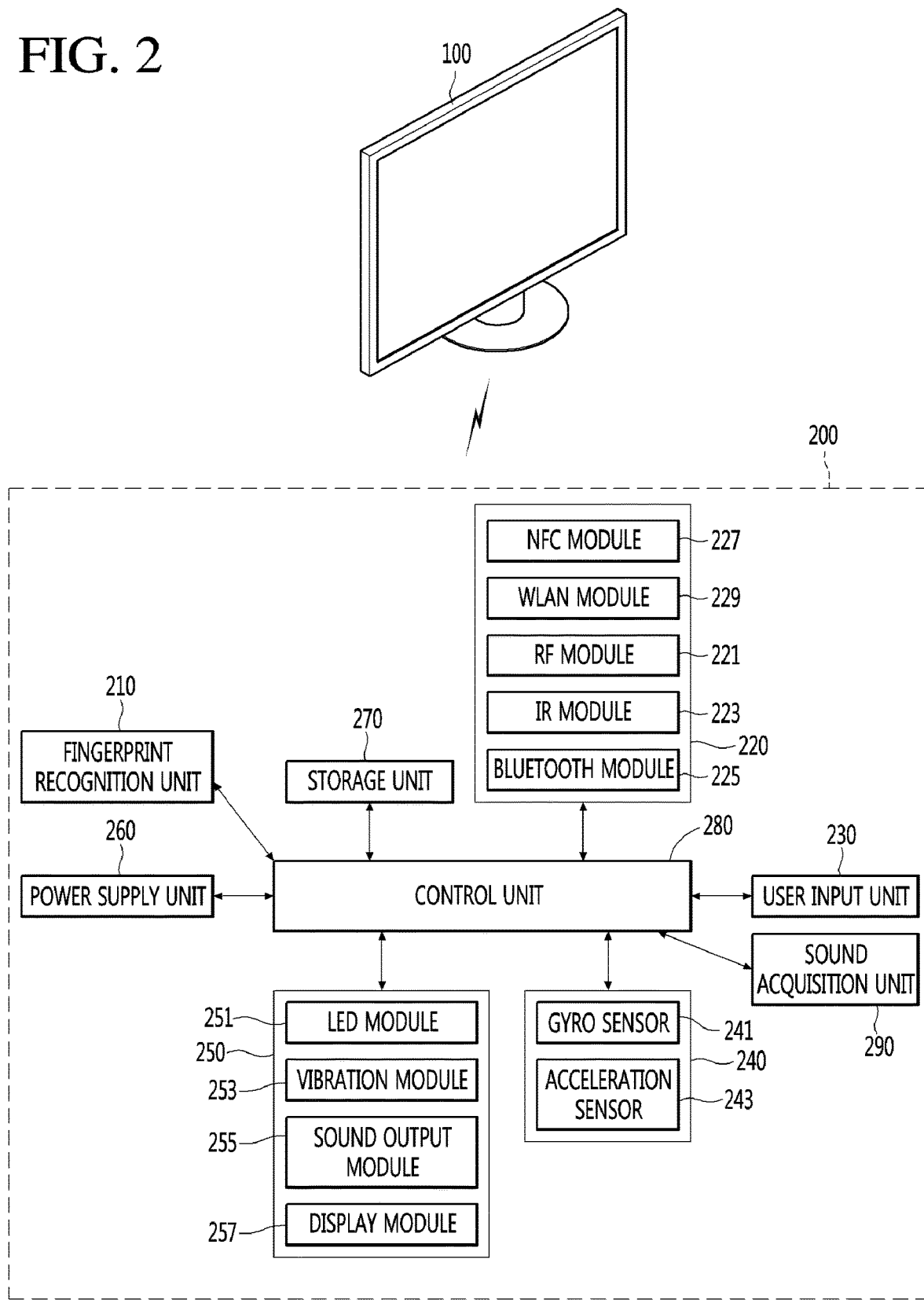
FIG. 2 is a block view illustrating a remote control device according to an embodiment of the present disclosure.
Figure 3:
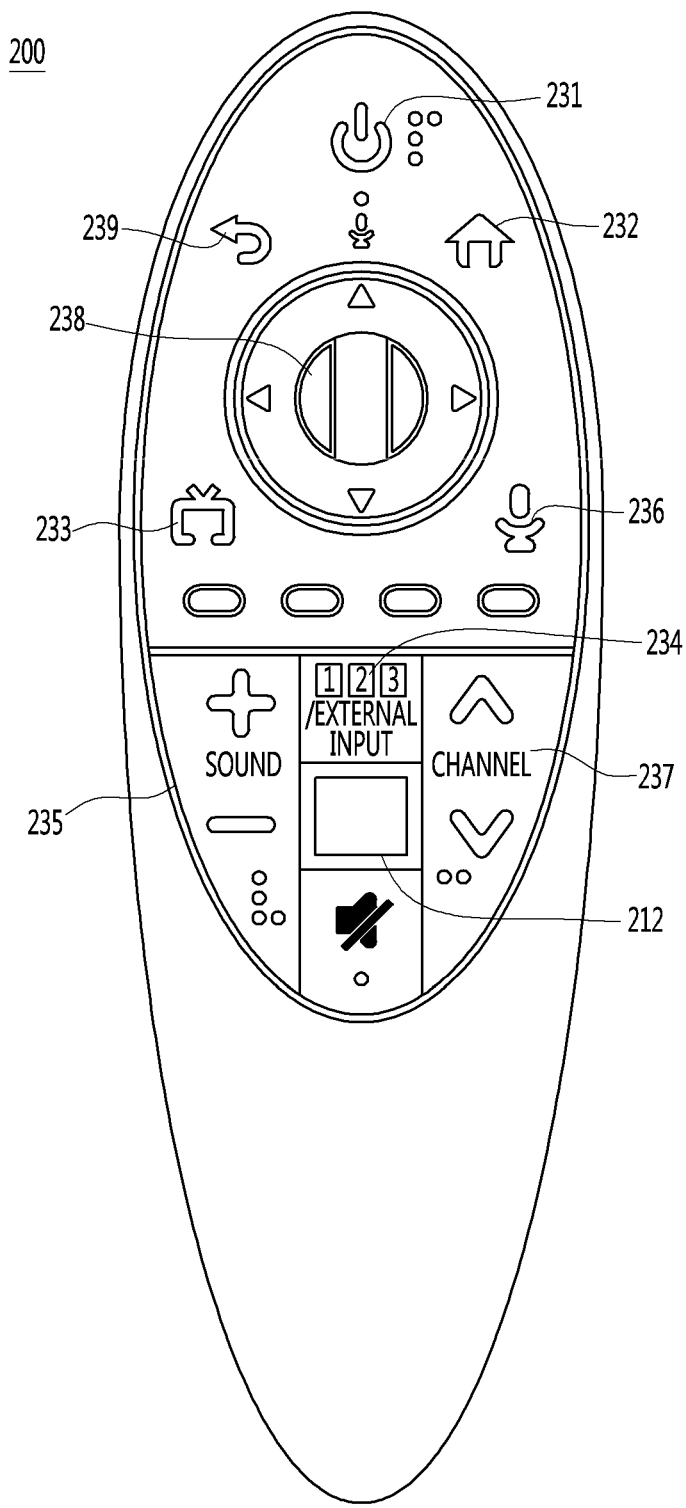
FIG. 3 is a view illustrating an actual configuration of a remote control device according to an embodiment of the present disclosure.

Next, referring to FIGS. 2 and 3, a remote control device is described according to an embodiment of the present disclosure. In particular, FIG. 2 is a block view illustrating a remote control device according to an embodiment of the present disclosure, and FIG. 3 is a view illustrating an actual configuration of a remote control device according to an embodiment of the present disclosure.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a controller 280, and a voice acquisition unit 290.

Referring to FIG. 2, the wireless communication unit 225 transmits/receives signals to/from an arbitrary any one of display devices according to the above-mentioned embodiments of the present disclosure. In addition, the remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards.

Further, the remote control device 200 can transmit signals containing information on a movement of the remote control device 200 to the display device 100 through the wireless communication unit 220. The remote control device 200 can also receive signals transmitted from the display device 100 through the RF module 221 and if necessary, can transmit a command on power on/off, channel change, and volume change to the display device 100 through the IR module 223.

In addition, the user input unit 230 can be configured with a keypad button, a touch pad, or a touch screen. Thus, the user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons including a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. In addition, the power button 231 can be a button for turning on/off the power of the display device 100, and the home button 232 can be a button for moving to the home screen of the display device 100. The live button 233 can be a button for displaying live broadcast programs, and the external input button 234 can be a button for receiving an external input connected to the display device 100. Further, the voice adjustment button 235 can be a button for adjusting the magnitude of a volume output from the display device 100. Also, the voice recognition button 236 can be a button for receiving user's voice and recognizing the received voice, and the channel change button 237 can be a button for receiving broadcast signals of a specific broadcast channel. In addition, the check button 238 can be a button for selecting a specific function and the back button 239 can be a button for returning to a previous screen.

Again, FIG. 2 is described. If the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present disclosure.

In addition, the sensor unit 240 can include a gyro sensor 241 or an acceleration sensor 243, and the gyro sensor 241 can sense information on a movement of the remote control device 200. For example, the gyro sensor 241 can sense information on an operation of the remote control device 200 based on x, y, and z axes and the acceleration sensor 243 can sense information on a movement speed of the remote control device 200. The remote control device 200 can further include a distance measurement sensor and sense a distance with respect to the display 180 of the display device 100.

In addition, the output unit 250 can output image or voice signals corresponding to a manipulation of the user input unit 235 or corresponding to signals transmitted from the display device 100. A user can recognize whether the user input unit 235 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 235 is manipulated or signals are transmitted/received to/from the display device 100 through the wireless communication unit 225.

Additionally, the power supply unit 260 supplies power to the remote control device 200 and if the remote control device 200 does not move for a predetermined time, stops the power supply, so that power waste can be reduced. The power supply unit 260 can also resume the power supply if a predetermined key provided at the remote control device 200 is manipulated.

Further, the storage unit 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

In addition, the controller 280 of the remote control device 200 can store, in the storage unit 270, information on a frequency band for transmitting/receiving signals to/from the display device 100 paired with the remote control device 200 and refer to it. Further, the controller 280 controls general matters relating to a control of the remote control device 200. For example, the controller 280 can transmit a signal corresponding to a predetermined key manipulation of the user input unit 235 or a signal corresponding to a movement of the remote control device 200 sensed by the sensor unit 240 to the display device 100 through the wireless communication unit 225.

Additionally, the voice acquisition unit 290 of the remote control device 200 can obtain voice. For example, the voice acquisition unit 290 can include at least one microphone 291 and obtain voice through the microphone 291.

Figure 4:
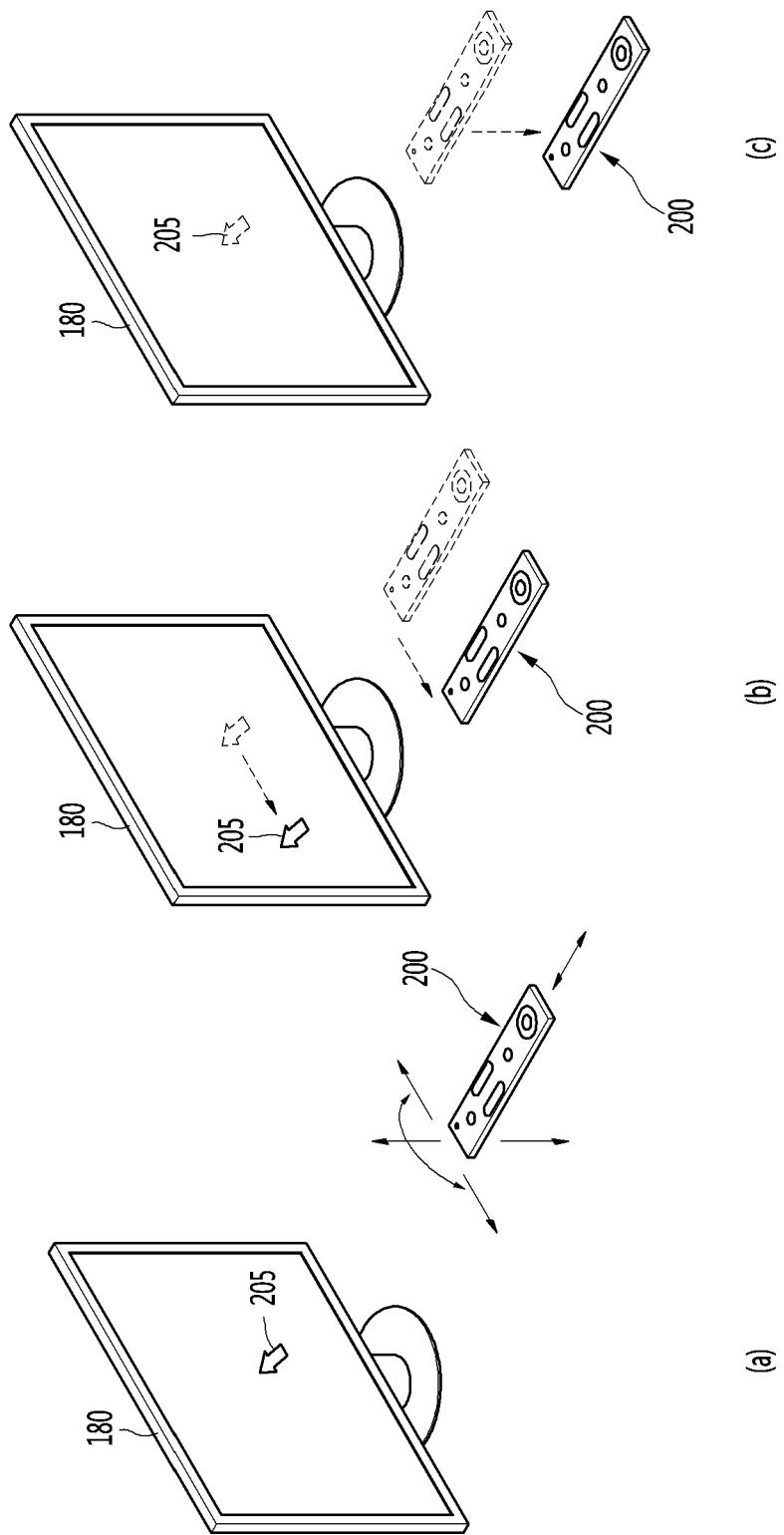
FIG. 4 is a view of utilizing a remote control device according to an embodiment of the present disclosure.

Next, FIG. 4 is a view of utilizing a remote control device according to an embodiment of the present disclosure. In particular, FIG. 4(a) illustrates that a pointer 205 corresponding to the remote control device 200 is displayed on the display 180.

A user can move or rotate the remote control device 200 vertically or horizontally. Accordingly, the pointer 205 displayed on the display 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

Further, FIG. 4(b) illustrates that if a user moves the remote control device 200, the pointer 205 displayed on the display 180 of the display device 100 is moved to the left in correspondence thereto. Information on a movement of the remote control device 200 detected through a sensor of the remote control device 200 is transmitted to the display device 100. The display device 100 can calculate the coordinates of the pointer 205 from the information on the movement of the remote control device 200. In addition, the display device 100 can display the pointer 205 to match the calculated coordinates.

FIG. 4(c) illustrates that while a specific button in the remote control device 200 is pressed, a user moves the remote control device 200 away from the display 180. Thus, a selection area in the display 180 corresponding to the pointer 205 can be zoomed in and displayed largely. If a user moves the remote control device 200 close to the display 180, a selection area in the display 180 corresponding to the pointer 205 can be zoomed out and displayed reduced.

If the remote control device 200 is away from the display 180, a selection area can be zoomed out and if the remote control device 200 is close to the display 180, a selection area can be zoomed in. Additionally, if a specific button in the remote control device 200 is pressed, the recognition of a vertical or horizontal movement can be excluded. That is, if the remote control device 200 is moved away from or close to the display 180, the up, down, left, or right movement may not be recognized and only the back and fourth movement may be recognized. While a specific button in the remote control device 200 is not pressed, only the pointer 205 is moved according to the up, down, left or right movement of the remote control device 200.

In addition, the moving speed or moving direction of the pointer 205 can correspond to the moving speed or moving direction of the remote control device 200. Furthermore, a pointer in this specification means an object displayed on the display 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display 180 and also can be displayed in correspondence to a plurality of points such as a line and a surface.

Figure 5:
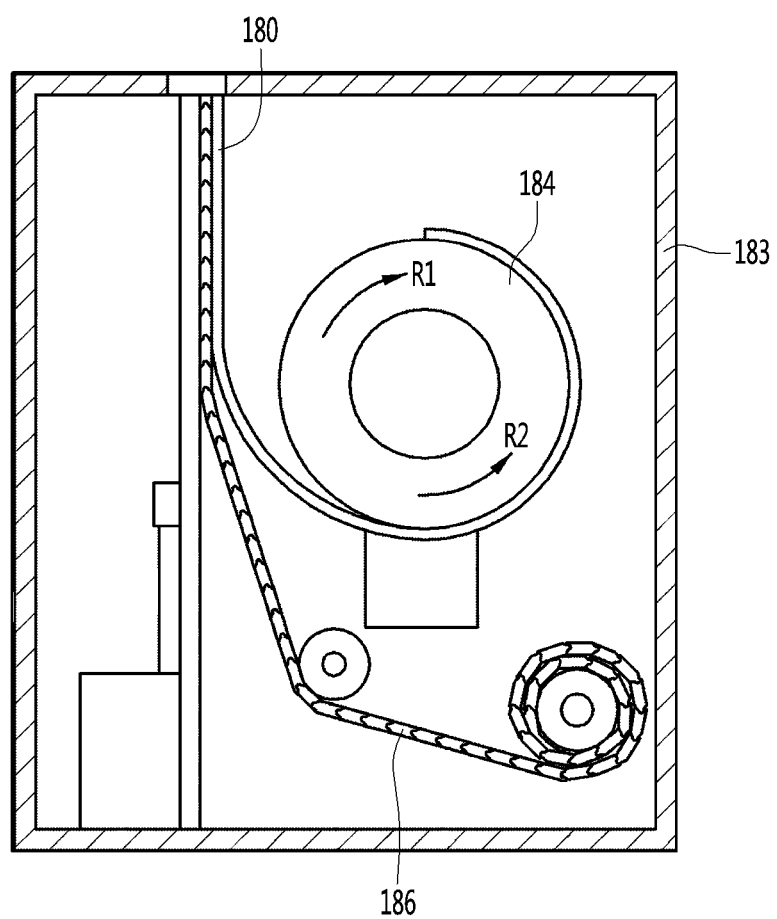
FIG. 5 is a cross-sectional view illustrating an internal part of a housing of a display device according to the present disclosure.

Next, FIG. 5 is a cross-sectional view illustrating an internal part of a housing of a display device according to the present disclosure. The display device 100 can include the housing 183, the display 180 that is drawn out from the housing 183 or is retracted thereinto, and the guide bar 184 configured to guide the display 180 to be wound or unwound. The guide bar 184 can be accommodated in the housing 183, and can be rotatable such that the display 180 is wound or unwound. For example, the guide bar 184 can be a roller that winds or unwinds the display 180.

Referring to FIG. 5, when the guide bar 184 rotates in the R1 direction, the display 180 can be drawn out of the housing 183. Also, when the guide bar 184 rotates in the R2 direction, the display 180 can be drawn into the housing 183, while being wound around the guide bar 184. As such, the display 180 can be drawn out or in in an up-down direction.

In addition, the display device 100 can be configured such that the display 180 is drawn out or in in a left-right direction. The display 180 can also be drawn out from the housing 183 or drawn into the housing 183 according to the rotation of the guide bar 184.

Further, the controller 170 can control the display 180 to display content in an area drawn out from the housing 183 of the display 180. The display device 100 can further include a cover 186 disposed in the housing 183 and to protect the display 180 drawn in the housing 183.

As such, as the display 180 is drawn out or is retracted, a region in which content is displayed can be increased or reduced. That is, as the display 180 is drawn out or is retracted, the region of the display 180 in which content is displayed can be variable.

Figure 6:
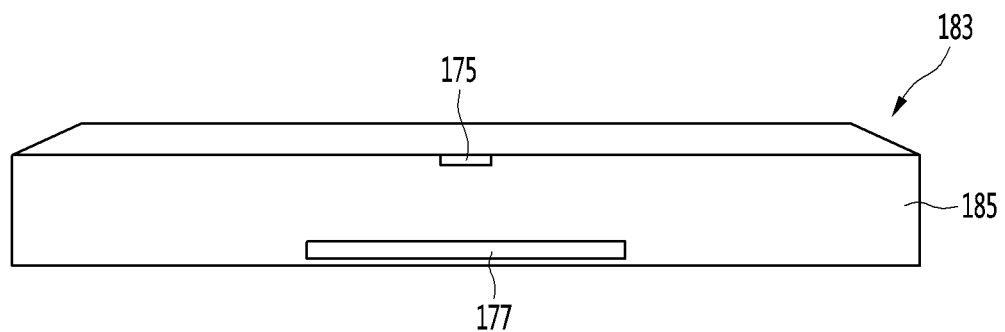
FIG. 6 is a view illustrating an example of the case in which a display is in a zero view mode according to an embodiment of the present disclosure.
Figure 7:
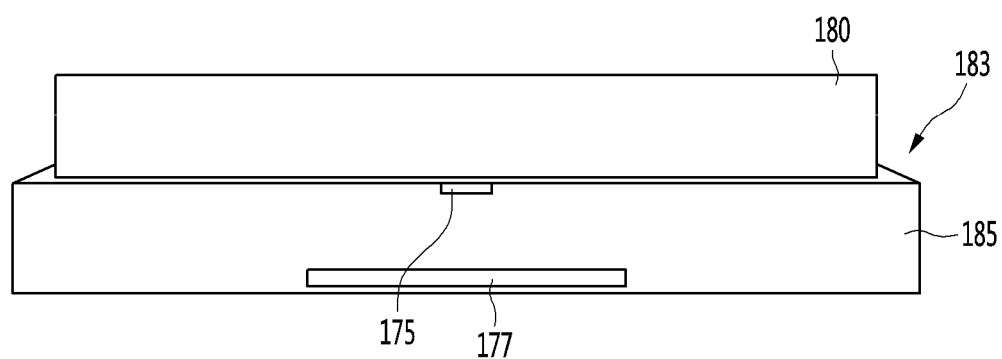
FIG. 7 is a view illustrating an example of the case in which a display is in a partial view mode according to an embodiment of the present disclosure.
Figure 8:
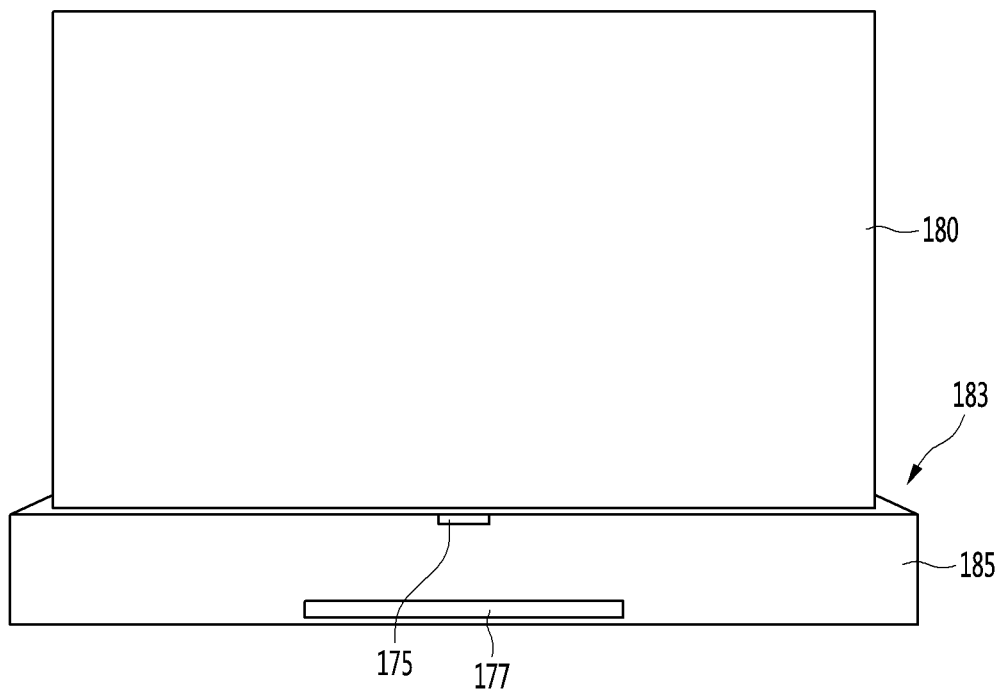
FIG. 8 is a view illustrating an example of the case in which a display is in a full view mode according to an embodiment of the present disclosure.

Next, with reference to FIGS. 6 to 8, a draw-out length of the display 180 according to an operation mode of the display device 100 is described. In particular, FIG. 6 is a view illustrating an example of when the display is in a zero view mode, FIG. 7 is a view illustrating an example of when the display is in a partial view mode, and FIG. 8 is a view illustrating an example of when the display is in a full view mode according to an embodiment of the present disclosure. The terms, e.g., 'zero view mode', 'partial view mode', and 'full view mode' used in the present disclosure are merely exemplary, and thus are be limited.

In addition, the zero view mode is an operation mode in which an entire portion of the display 180 is retracted into the housing 183. As illustrated in FIG. 6, in the zero view mode, the display 180 is entirely located inside the housing 183. For example, when the display device 100 operates in a speaker mode, the display device 100 can control a display mode to be the zero view mode. In addition, when the power of the display device 100 is turned off, the display device 100 can control the display 180 to be in the zero view mode.

When the display 180 is in the zero view mode, content is not displayed in an entire region of the display 180. Further, the display 180 can be turned off in the zero view mode.

In addition, the partial view mode is an operation mode in which a portion of the display 180 is drawn out from the housing 183. As shown in FIG. 7, in the partial view mode, a part of the display 180 is located inside the housing 183 and the other part of the display 180 is located outside the housing 183. For example, when the display device 100 is operated in a menu mode, a mood mode, a music mode, a frame mode, a clock mode, or the like, the display 180 can be controlled to be in the partial view mode.

When the display 180 is in the partial view mode, content can be displayed only in a region of the display 180, which is drawn out from the housing 183. That is, in the partial view mode, content is not displayed in a region of the display 180, which is retracted into the housing 183.

Further, the full view mode is an operation mode in which the display 180 is drawn out from the housing 183 to the maximum. That is, the full view mode is a mode in which the draw-out length of the display 180 from the housing 183 is a maximum length. As shown in FIG. 8, in the full view mode, the display 180 is entirely drawn out from the housing 183.

For example, when the display device 100 is operated in a normal mode, the display 180 can be controlled in the full view mode, and in this instance, the normal mode can be a mode in which a broadcast image, an input image from the external device interface unit 135, or the like is output. When the display 180 is in the full view mode, content can be displayed in a region of the display 180, which is drawn out from the housing 183. Also, in the full view mode, the display 180 can display content in an entire region of the display 180, from which content is capable of being output.

As described with reference to FIGS. 6 to 8, the display region of content can be changed depending on the draw-out length of the display 180. However, when the display mode is the zero view mode, it can be difficult for the user to know whether the display device 100 is operable. For example, since the display 180 is entirely located inside the housing 183 in the zero view mode, the user can have difficulty in knowing whether the display device 100 is operable, whether it is possible to view video through the display device 100, or whether the display device 100 can interwork with an external device.

Therefore, the display device 100 can output an alarm for informing the user about whether the display device 100 is operable in the zero view mode. In particular, when the user is nearby, the display device 100 can output an alarm for informing the user that the display device 100 can be operated through the user's mobile device.

In addition, the controller 170 can receive a user input for setting whether to output an alarm. That is, the controller 170 can receive a user input for setting whether to output an alarm or not so that alarm is output or not according to an alarm output condition (to be described later). This is because some users may be uncomfortable with an alarm output. Therefore, when an alarm output is set to ON, the controller 170 can detect the alarm output condition and output an alarm, and when an alarm output is set to OFF, the controller 170 does not detect the alarm output condition.

Figure 9:
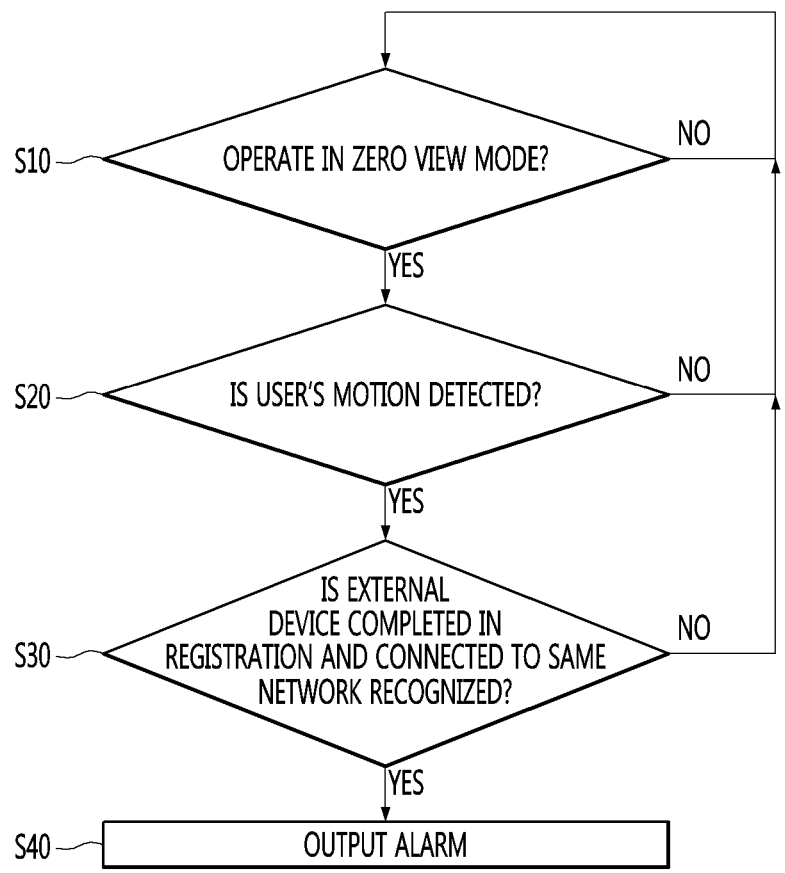
FIG. 9 is a flowchart illustrating a method of operating a display device according to an embodiment of the present disclosure.

Next, a method of operating the display device 100 when the alarm output is set to ON will be described. In particular, FIG. 9 is a flowchart illustrating a method of operating a display device according to an embodiment of the present disclosure. As shown, the controller 170 determines whether the display 180 is in the zero view mode (S10). Through this, the controller 170 can output an alarm only when the display operates in the zero view mode. In addition, the controller 170 can recognize the current display mode and determine whether the current display mode is the zero view mode.

Next, the controller 170 can detect a user's motion when the display operates in the zero view mode (S20). Through this, the controller 170 can control to output an alarm only when detecting the user's motion. Also, the controller 170 can control the motion recognition sensor 175 to detect the user's motion when the display operates in the zero view mode.

Next, a method of detecting a user's motion by the display device 100 according to an embodiment of the present disclosure will be described with reference to FIG. 10. In particular, FIG. 10 is a view illustrating a method of detecting a user's motion by a display device according to an embodiment of the present disclosure.

The motion recognition sensor 175 can be provided in the housing 183. For example, as shown in FIG. 10, the motion recognition sensor 175 can be disposed in the middle of an upper portion of a front surface of the housing 183. However, the aforementioned position is merely an example for convenience of description, and the position of the motion recognition sensor 175 can include any position at which a user's motion in a front direction of the display device 100 can be detected. Here, the front direction of the display device 100 refers to a direction which is the same as that of a surface on which an image is output from the display 180.

Figure 10:
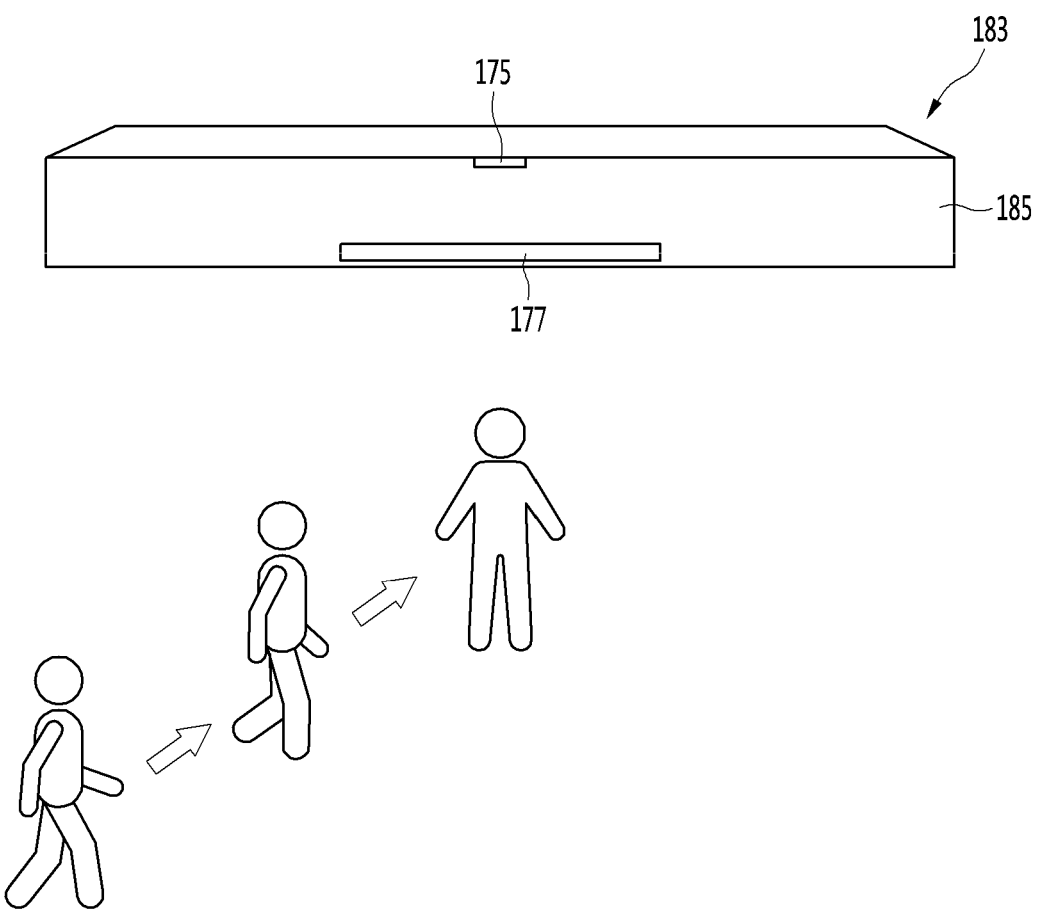
FIG. 10 is a view illustrating a method of detecting a user's motion by a display device according to an embodiment of the present disclosure.

Referring to the example of FIG. 10, at least one user can move in the front direction of the display device 100 when no one is in the front direction of the display device 100, and in this instance, the motion recognition sensor 175 can detect the user's motion in front of the display device 100. In addition, the user's motion can include not only the appearance of the user as shown in FIG. 10 but also all motions such as a user's motion that the user is motionless in front of the display device 100. This will be described again with reference to FIG. 9.

If a user's motion is not detected (No in S10), the controller 170 can determine whether the display operates in the zero view mode again. When the user's motion is detected (Yes in S20), the controller 170 can recognize if an external device is completed in registration and connected to the same network (S30).

Then, the controller 170 can output an alarm only when the external device is an external device that has completed registration with the display device 100 and an external device which is connected to the same network (S40). In addition, registration can refer to a series of processes in which the display device 100 controls an external device or the display device 100 and the external device exchange device information with each other and store the same so that the display device 100 is controlled by the external device. Registration can be executed only first one time.

Further, the registered external device can refer to an external device that has already exchanged device information with the display device 100 based on previously executed registration. For example, the external device can be a mobile terminal carried by the user such as a smartphone, a mobile phone, etc., but this is merely an example and is not limited thereto.

Hereinafter, a method in which the display device 100 and an external device 500 are registered with each according to an embodiment of the present disclosure will be described. In particular, FIGS. 11 and 12 illustrate the display device 100 and the external device 500 are registered by the external device 500, but conversely, the display device 100 and the external device 500 can be registered by the display device 100.

Figure 11:
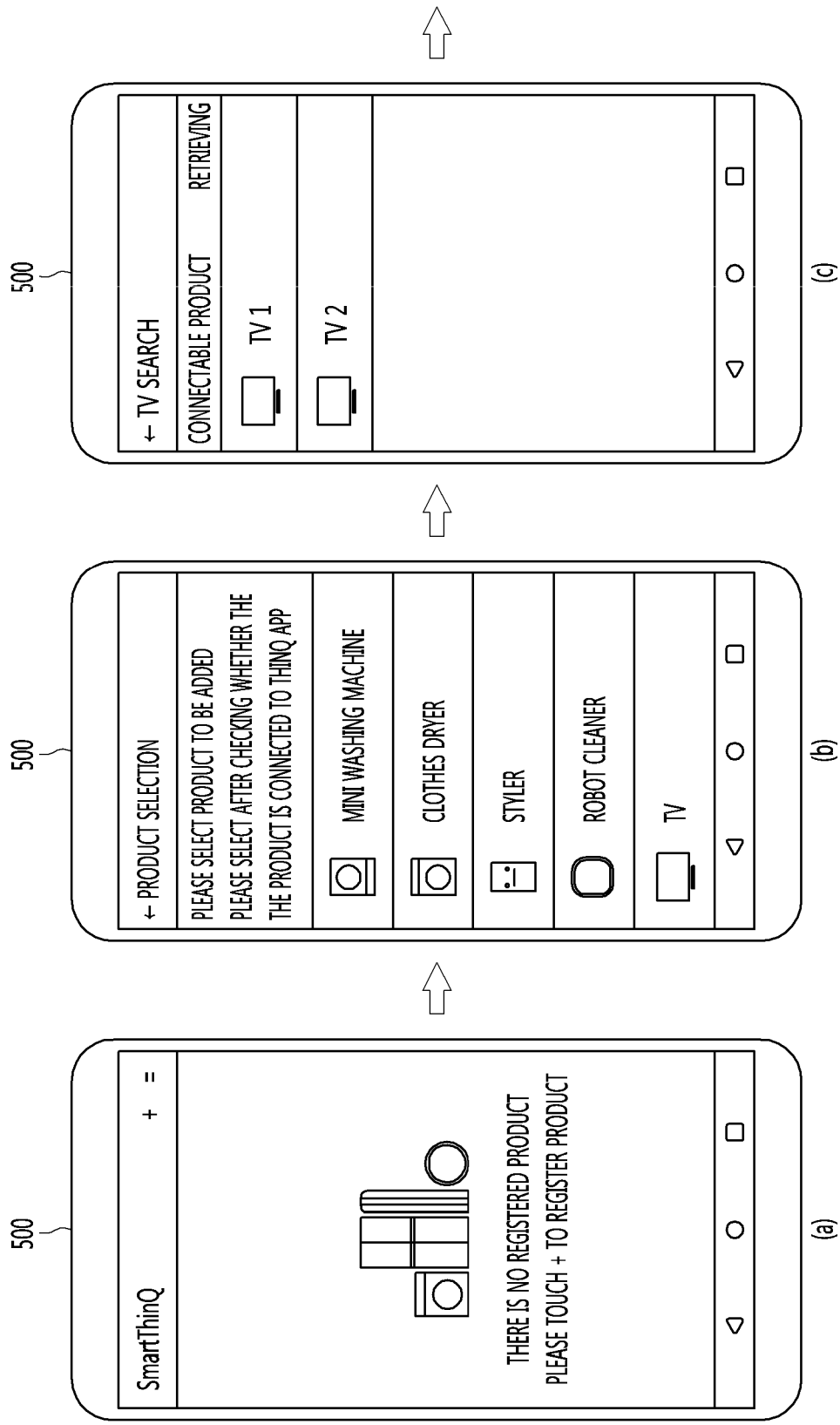
FIGS. 11 and 12 are diagrams illustrating a method of registering an external device by a display device according to an embodiment of the present disclosure.
Figure 12:
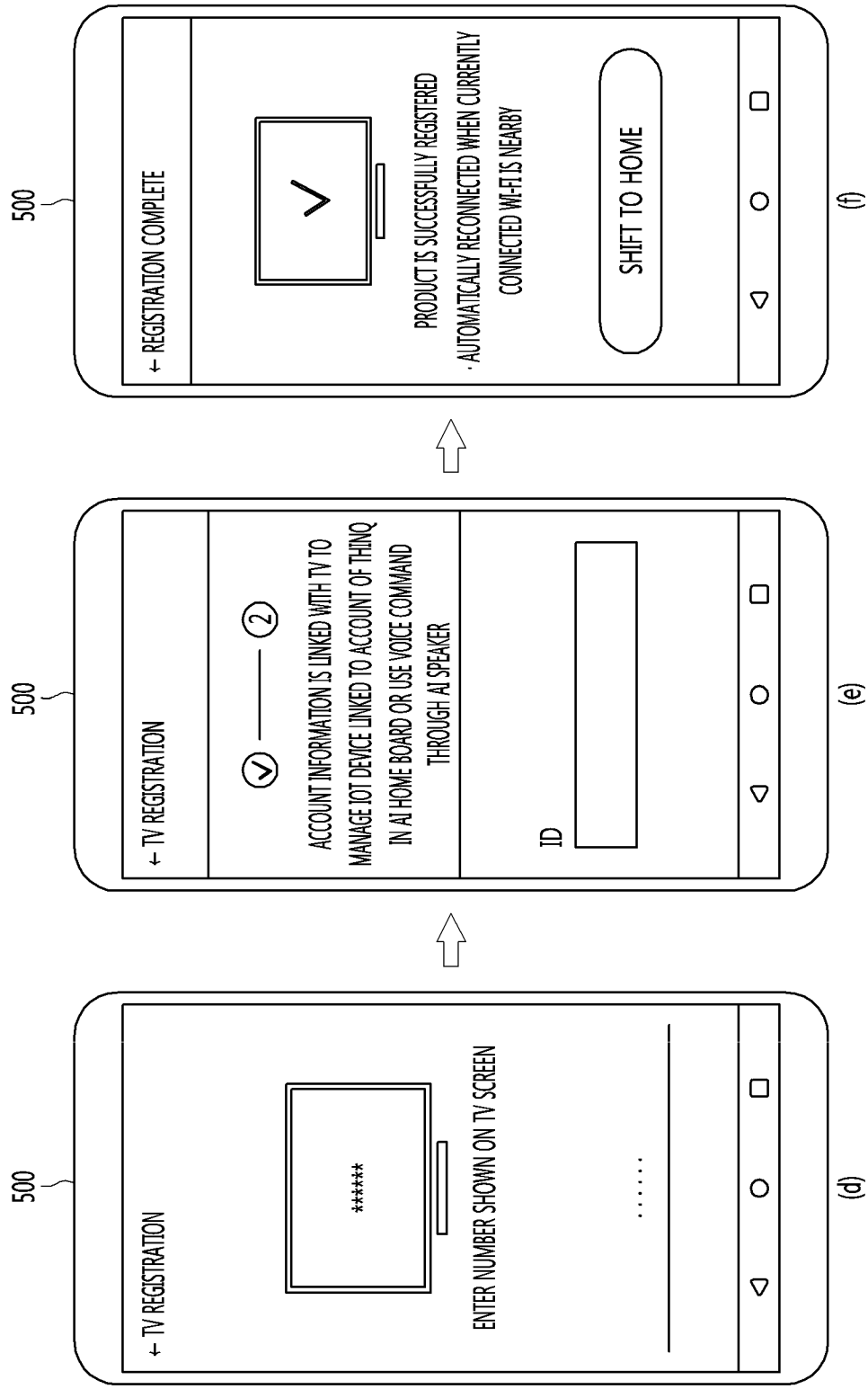

In more detail, FIGS. 11 and 12 are diagrams illustrating a method of registering an external device by a display device according to an embodiment of the present disclosure. As shown in (a) of FIG. 11, the external device 500 can display an initial screen for registration. In addition, the external device 500 can receive a command for selecting an additional icon (e.g., +icon) from the initial screen.

When the external device 500 receives a command for selecting an additional icon, the external device 500 can display a product selection screen as illustrated in (b) of FIG. 11. The external device 500 can then receive a command for selecting any one product from the product selection screen. When a command for selecting a TV from the product selection screen is received, the external device 500 can display a TV selection screen as shown in (c) of FIG. 11. The TV selection screen can display a TV which can be connected to the external device 500.

If any one of the external devices 500 is selected on the TV selection screen, the external device 500 can display a TV registration screen as shown in FIG. 12(d). The TV registration screen can be a screen for receiving a number output from the selected TV. In addition, the user can input the number output from the TV to the TV registration screen.

When the external device 500 receives a number corresponding to the number output from the TV, the display device 100 and the external device 500 can exchange device information with each other. Further, the device information can be information required for the corresponding device to be controlled as a control target. For example, the device information can be a MAC address, but this is merely an example.

As the device information is exchanged between the display device 100 and the external device 500, the display device 100 and the external device 500 can complete registration. In addition, the external device 500 can display an account linking screen as shown in (e) of FIG. 12 after completion of registration. The account linking screen can be a screen for linking a user account with a TV.

When the account linking is completed through the account linking screen, the external device 500 can display a registration completion screen as shown in (0 of FIG. 12. Further, the step of displaying the account linking screen can be omitted, or the account linking procedure can be omitted even if the account interlocking screen is displayed. Also, the screens and methods shown in FIGS. 11 and 12 are merely illustrative, and the display device 100 can register the external device 500 through another method.

Next, an external device connected to the same network will be described. In more detail, the controller 170 can recognize an external device connected to the same network as well as the completion of registration described above. Here, the external device connected to the same network can refer to an external device connected to the same access point (AP) to which the display device 100 is connected. That is, the external device connected to the same network can refer to an external device connected to the same Wi-Fi to which the display device 100 is connected.

Through this, the controller 170 can output an alarm when the external device is connected to the same AP to which the wireless communication unit 173 is connected, and then re-connected. When the controller 170 recognizes the external device connected to the same network, a recognition speed and accuracy of recognition can be improved.

In more detail, the display device 100 can recognize an external device connected by Bluetooth low energy (BLE) instead of the same AP. However, since the BLE connection operates based on a random address, it is impossible to recognize an external device that has been disconnected through a BLE connection address. In addition, device advertising and device scanning operations are required for BLE connection, and here, since only a part of the Bluetooth channels are used, a congested environment is formed to increase packet errors/losses, and thus, accuracy of recognition of an external device can be degraded.

In addition, since a BLE module and a Wi-Fi module are generally provided as one chip in the display device 100, one antenna is used in a time division manner. Here, since Wi-Fi has priority higher than BLE, the performance of BLE cannot be maximized. For example, a maximum power of BLE can be less than 11 dBm, while a maximum power of Wi-Fi is 20 dBm on a specific display device. Therefore, BLE is likely to be disconnected regardless of user intention even after connection thereof is completed, resulting in low connection stability and slow communication speed.

In addition, since BLE connection and a distance for maintaining the connection is shorter than the Wi-Fi, BLE is difficult to connect and maintain the connection. Therefore, recognizing the external device connected to the same network by the display device 100 minimizes the influence of wireless environment and ensures a higher speed and accuracy of recognizing the external device. Therefore, in one embodiment in the present disclosure, it can be preferable for the display device 100 to recognize an external device connected to the same network, not an external device connected by BLE.

If the controller 170 fails to recognize an external completed in registration and connected to the same network, the controller 170 can determine whether the display operates in the zero view mode again. In addition, the display device 100 according to the present disclosure is not limited to the order of step S20 and step S30 described above. That is, when a user's motion is detected and an external device connected to the same AP to which the wireless communication unit 173 is connected is recognized, the display device 100 can output an alarm.

Further, the order of step S20 and step S30 shown in FIG. 9 is merely an example for convenience of description and can be modified. In more detail, the controller 170 can periodically recognize an external device connected to the same AP to which the wireless communication unit 173 is connected, and output an alarm according to the presence or absence of the recognized external device when a user's motion is detected. That is, the controller 170 can periodically recognize the external device connected to the same AP to which the wireless communication unit 173 is connected, and can check the presence of the recognized external device when a user's motion is detected. The controller 170 can then output an alarm when the recognized external device exists if the user's motion is detected, and not output an alarm when the recognized external device does not exist if the user's motion is detected. That is, the controller 170 can output an alarm when the user's motion is detected in a state where the external device completed in registration and connected to the same network is recognized.

Further, the controller 170 can output an alarm when the external device completed in registration and connected to the same network is recognized (S40). Here, the alarm can be an alarm for notifying the user that there is an external device to which the display device 100 can be linked. Alternatively, the alarm can be an alarm for notifying the user that the display device 100 is in a state capable of interworking with an external device. In addition, the alarm can be an alarm for notifying the user that the display device 100 is operable by the user, or the alarm can be welcome feedback that welcomes user's appearance. Also, the controller 170 can output an alarm in various manners.

According to an embodiment of the present disclosure, the controller 170 can output an alarm by driving at least one of the audio output unit 185 or the light emitter 177. In more detail, FIG. 13 is a view illustrating a method of outputting an alarm by a display device according to an embodiment of the present disclosure.

As illustrated in FIG. 13, the audio output unit 185 and the light emitter 177 can be formed on a front surface of the housing 183, which is merely illustrative and the present disclosure is not limited thereto. When a user's motion is detected through the motion recognition sensor 175 and an external device connected to the same AP to which the wireless communication unit 173 is connected is recognized, the controller 170 can output an alarm by outputting a sound through the audio output unit 185 and emitting light through the light emitter 177.

The user can then recognize the alarm of the display device 100 through the sound or light from the display device 100. For example, through the sound or light emitted from the display device 100, the user can recognize the presence of the external device that can be linked to the display device 100, recognize that the display device 100 can be linked to the external device, or recognize that the display device 100 is operable by the user. However, according to an embodiment, unlike the case illustrated in FIG. 13, the controller 170 can output the alarm by driving only the audio output unit 185 or can output the alarm by driving only the light emitter 177.

Further, according to the first embodiment, the display device 100 can output the alarm when a preset alarm output condition is satisfied, that is, when a user's motion is detected and an external device connected to the same AP is recognized. According to a second embodiment, the controller 170 does not output the alarm within a predetermined time after outputting the alarm, even if the alarm output condition is satisfied. Specifically, the controller 170 does not output the alarm when the user's motion is re-detected within the predetermined time after outputting the alarm and the external device connected to the same AP to which the wireless communication unit 173 is re-recognized. In this instance, the predetermined time can be several seconds. For example, the predetermined time can be 10 seconds, but it is only an example and is not limited thereto.

That is, the controller 170 can output the alarm according to the alarm output condition only when the predetermined time has passed after outputting the alarm. This is advantageous in that the display device 100 can minimize a case of frequently outputting the alarm by sensitively detecting even a user's small motion.

According to a third embodiment, the display device 100 has a limited maximum number of times to output the alarm for a preset time, and thus, the controller 170 can output the alarm less than the maximum number of times for the preset time, regardless of the alarm output condition.

Figure 14:
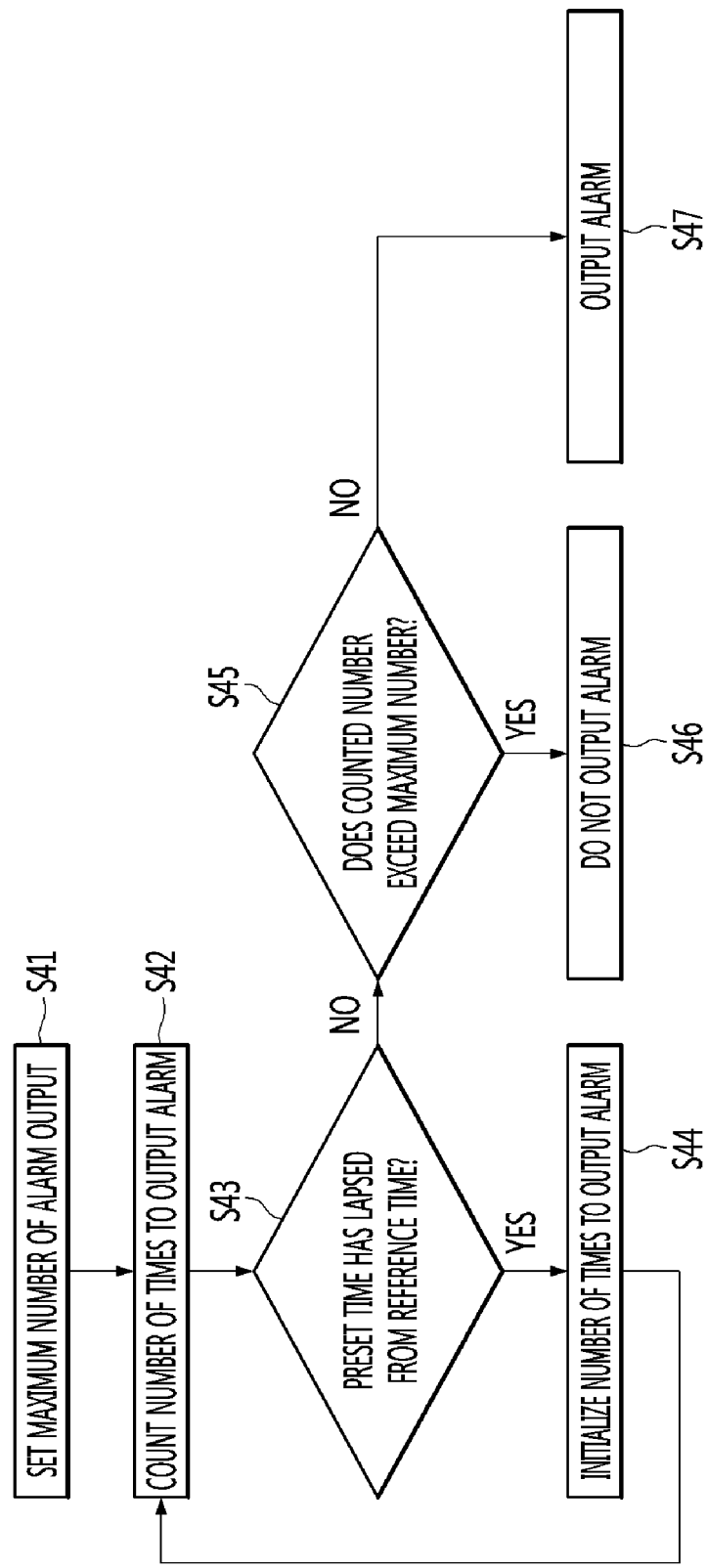
FIG. 14 is a flowchart illustrating a method of outputting an alarm at a maximum number of times or less according to an embodiment of the present disclosure.

Next, FIG. 14 is a flowchart illustrating a method of outputting an alarm at a maximum number of times or less according to an embodiment of the present disclosure. As shown, the controller 170 can set the maximum number of alarm outputs (S41). For example, the controller 170 can set the maximum number of times in advance or set the maximum number of times according to a default value (e.g., 2). Alternatively, the controller 170 can set the maximum number of times according to a user input. In this instance, the user can advantageously set a preferred number as the maximum number as necessary.

In addition, the controller 170 can count the number of times to output the alarm (S42). For example, the controller 170 can count the number of times to output the alarm each time the alarm is output. The controller 170 can also determine whether a preset time has elapsed from a reference time (S43), and when the preset time has lapsed from the reference time (Yes in S43), the controller can initialize the number of times to output the alarm (S44) and count the number of times to output the alarm again.

When the preset time has not elapsed from the reference time (No in S43), the controller 170 can determine whether the counted output number exceeds the maximum number of times (S45). When the counted output number exceeds the maximum number of times (Yes in S45), the controller 170 does not output the alarm (S46), and when the counted output number does not exceed the maximum number of times (No in S45), the controller 170 can output the alarm (S47).

In the following description, it is assumed that the preset time is 24 hours and the maximum number of times is 2, but this is merely an example for convenience of description and the present invention is not limited thereto. In addition, the reference time can be set in various manners.

According to the first embodiment, the reference time can be a predetermined time. That is, in this instance, the controller 170 can limit the maximum number of times to output an alarm for the preset time based on the predetermined time. For example, when the predetermined time is 12:00 a.m., the controller 170 can always limit the maximum number of times of the alarm output for 24 hours based on 12:00 a.m. to 2 times.

That is, even if the alarm output number is one time for 24 hours from 12:00 a.m., the controller 170 can initialize the output number when 12:00 a.m. of the next day arrives, and limit the maximum number of outputs for 24 hours to two times. In this instance, it is possible to minimize user disturbance due to frequent outputs of the alarm.

According to the second embodiment, the reference time can be a time at which the alarm was last output. That is, in this instance, the controller 170 can limit the maximum number of times to output the alarm for a preset time based on a time when the alarm was last output. For example, the controller 170 can output the alarm less than or equal to the maximum number of times for 24 hours from 10: a.m., if the last time the alarm was output is 10:00 a.m. If the controller 170 outputs the alarm once at 11:00 a.m. with respect to 10:00 a.m. and outputs the alarm once in the afternoon, the controller 170 can limit the maximum number of times for alarm for 24 hours with respect to 1:00 p.m. to two times. If the alarm is output once at 11:00 a.m. with respect to 10:00 a.m. and is not output until 10:00 a.m. next day, the controller 170 can limit the maximum number of times for alarm for 24 hours with respect to 10:00 a.m. to two times.

That is, according to the second embodiment, the controller 170 does not output the alarm even if the alarm output condition is satisfied before the preset time arrives when the alarm is output the maximum number of times. When the alarm is output the maximum number of times, the controller 170 can limit the number of times to output the alarm again with respect to the last output time.

In this instance, the display device 100 has an advantage of minimizing the problem that the alarm is output too frequently to reflect the user activity time. That is, the display device 100 has an advantage of minimizing user disturbance due to frequent output of the alarm according to each user.

Also, according to an embodiment, when the alarm is output, the controller 170 can drive at least one of the audio output unit 185 and the light emitter 177 and simultaneously transmit a control signal to the external device 500. Here, the control signal can be a signal for controlling the external device 500.

In addition, when outputting the alarm, the controller 170 can transmit a signal for controlling power of a set-top box (STB) connected to the display device 100 to the STB. This is to reduce a time required for turning on the STB by predicting that the user is highly likely to turn on the STB because the user is near the display device 100.

According to another embodiment, when the alarm is output, the controller 170 can transmit a control signal to the external device 500 to display information for operating the display device 100 through the external device 500. The information for operating the display device 100 can be information on the display device 100 that the user can operate through the external device 500.

Figure 15:
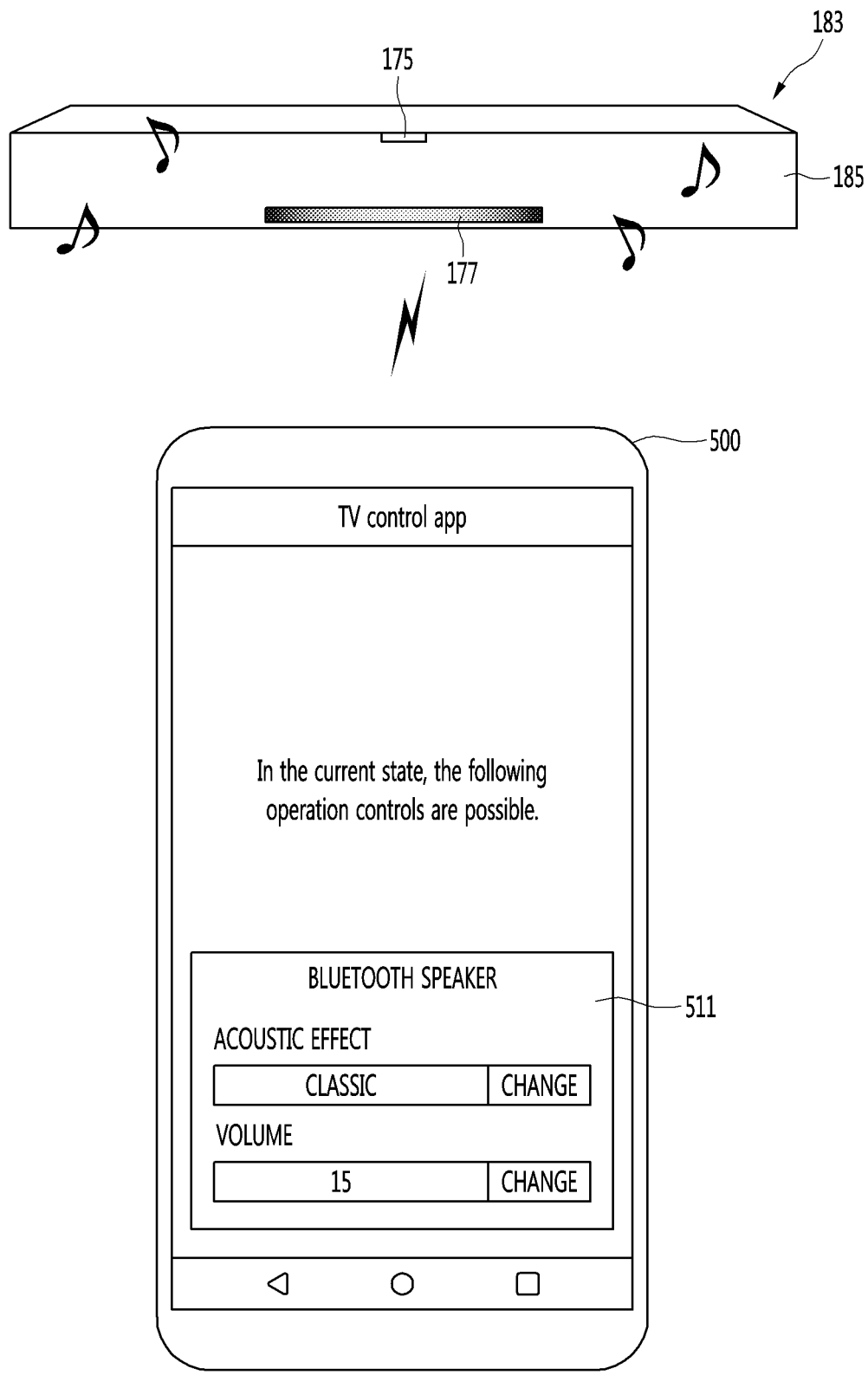
FIGS. 15 and 16 are diagrams illustrating an example in which a display device transmits a control signal to an external device according to an embodiment of the present disclosure.
Figure 16:
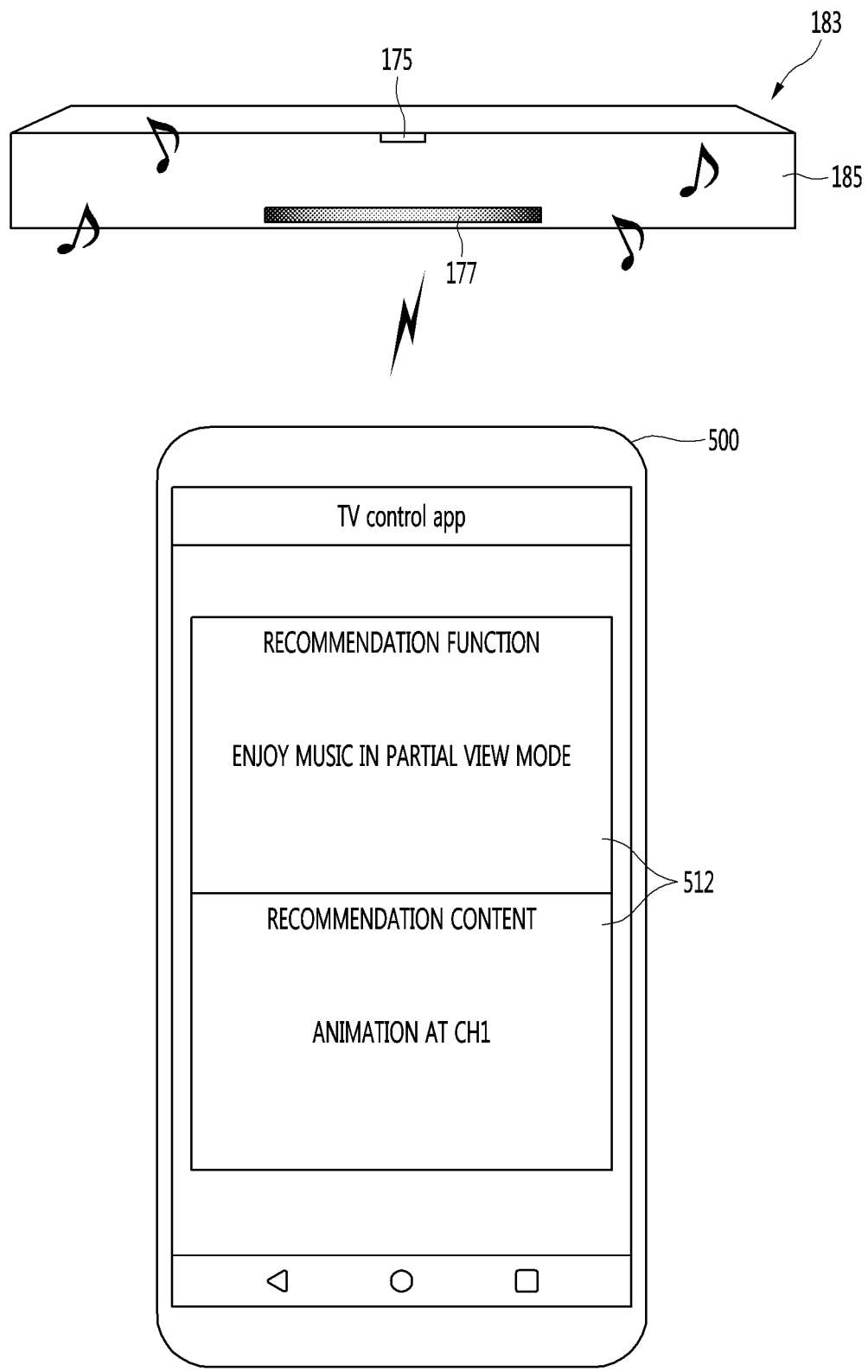

Next, FIGS. 15 and 16 are diagrams illustrating an example in which a display device transmits a control signal to an external device according to an embodiment of the present disclosure. For example, the information for operating the display device 100 can be functional information available in the zero view mode. In this instance, the controller 170 can display the functional information available in the zero view mode, and as shown in FIG. 15, the functional information available in the zero view mode can transmit a control signal to the external device 500 so that Bluetooth speaker information 511 is displayed.

As another example, the information for operating the display device 100 can be recommendation information through the display device 100. In this instance, the controller 170 can display the recommendation information through the display device 100, and as shown in FIG. 16, the controller 170 can transmit a control signal to external device to display the recommendation information 512 through the display device 100. According to the example of FIG. 16, the recommendation information 512 through the display device 100 can include at least one of a recommendation function and recommended content, and the recommended content can include a TV program preferred by the user, a new episode of a program preferred by the user in OTT, a new episode of an image preferred by the user in an application.

As described above, the display device 100 can transmit the control signal to the external device 500 while outputting the alarm according to detection of appearance of the user. Accordingly, the user can more easily check the information for operating the display device 100 through the external device 500. Also, when the display operates in the zero view mode, a user's motion is detected, and an external device connected to the same AP is recognized, the controller can perform a specific operation according to a preset operating condition.

Figure 17:
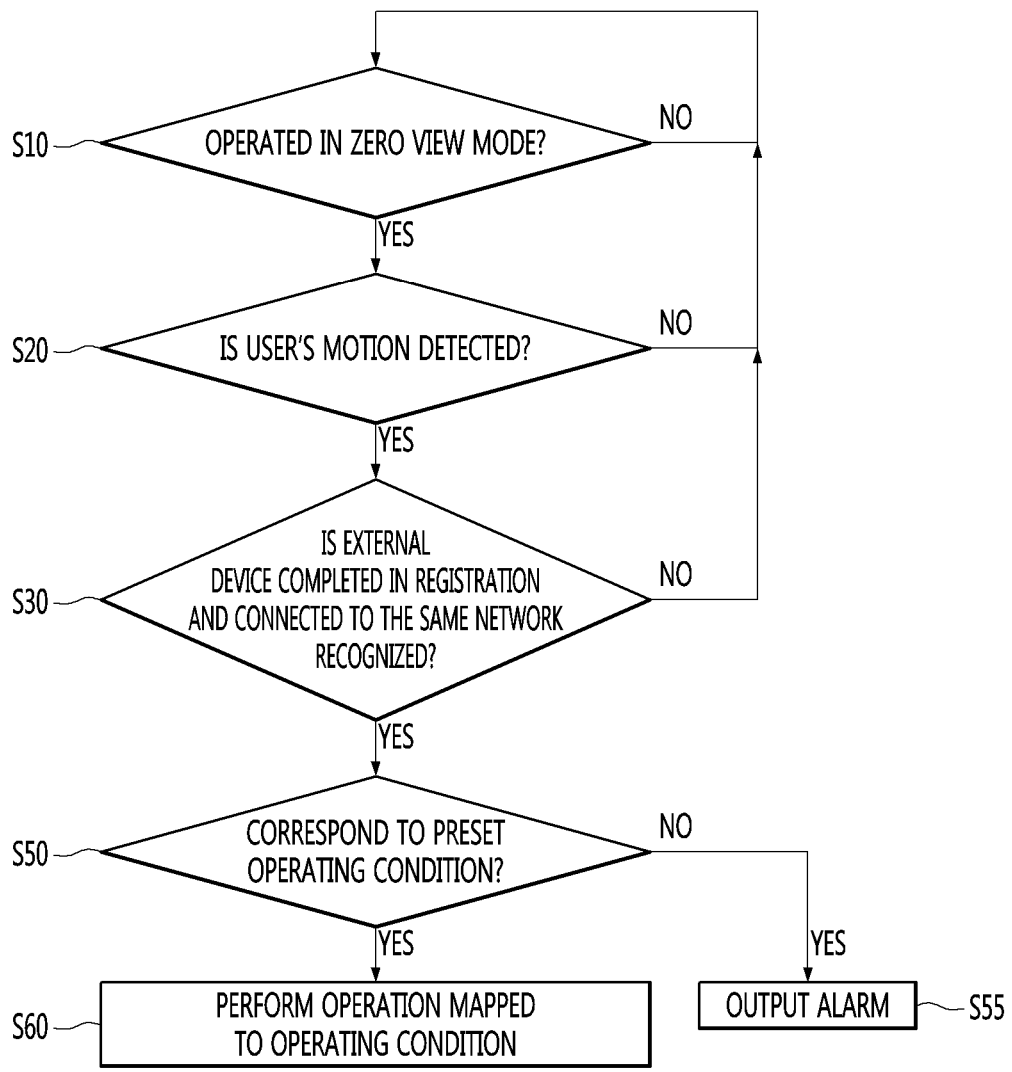
FIG. 17 is a flowchart illustrating a method of operating a display device according to another embodiment of the present disclosure.

Next, FIG. 17 is a flowchart illustrating a method of operating a display device according to another embodiment of the present disclosure. Steps S10 to S30 are the same as described above with reference to FIG. 9, and thus redundant descriptions thereof will be omitted. Hereinafter, a method of operating the display device 100 from step S50 will be described.

When the display operates in the zero view mode, a user's motion is detected, and an external device connected to the same AP is recognized, the controller 170 can determine whether the preset operating condition is satisfied (S50).

If the preset operating condition is not satisfied (No in S50), the controller can output the alarm (S55), and the alarm and the alarm output method here are the same as those described above in step S40 of FIG. 9. Therefore, redundant descriptions will be omitted. If the preset operating condition is satisfied (Yes in S50), the controller 170 can perform an operation mapped to the operating condition (S60). The preset operating condition and an operation mapped to each operating condition can be set as a default or can be variously set according to a user input. Hereinafter, various operations based on the preset operating conditions will be described.

According to the first embodiment, the preset operating condition can be an event occurrence in a home appliance. In this instance, the home appliance can include at least one home appliance connected to the same AP to which the display device 100 is connected. Alternatively, the home appliance can be a home appliance registered in the display device 100. For example, when there are a plurality of home appliances connected to the same AP to which the display device 100 is connected, the controller 170 can determine whether an event occurs in each of the plurality of home appliances. In addition, the home appliance can be various types of home appliances such as a dryer, a washing machine, an induction, a dishwasher, a refrigerator, and the like.

Accordingly, when a user's motion is detected and Ian external device connected to the same AP to which the wireless communication unit 173 is connected is recognized, if the occurrence of an event of at least one home appliance connected to the display device is detected, the controller 170 can switch the display 180 from the zero view mode to the partial view mode or the full view mode and control the display 180 to display the event.

Figure 18:
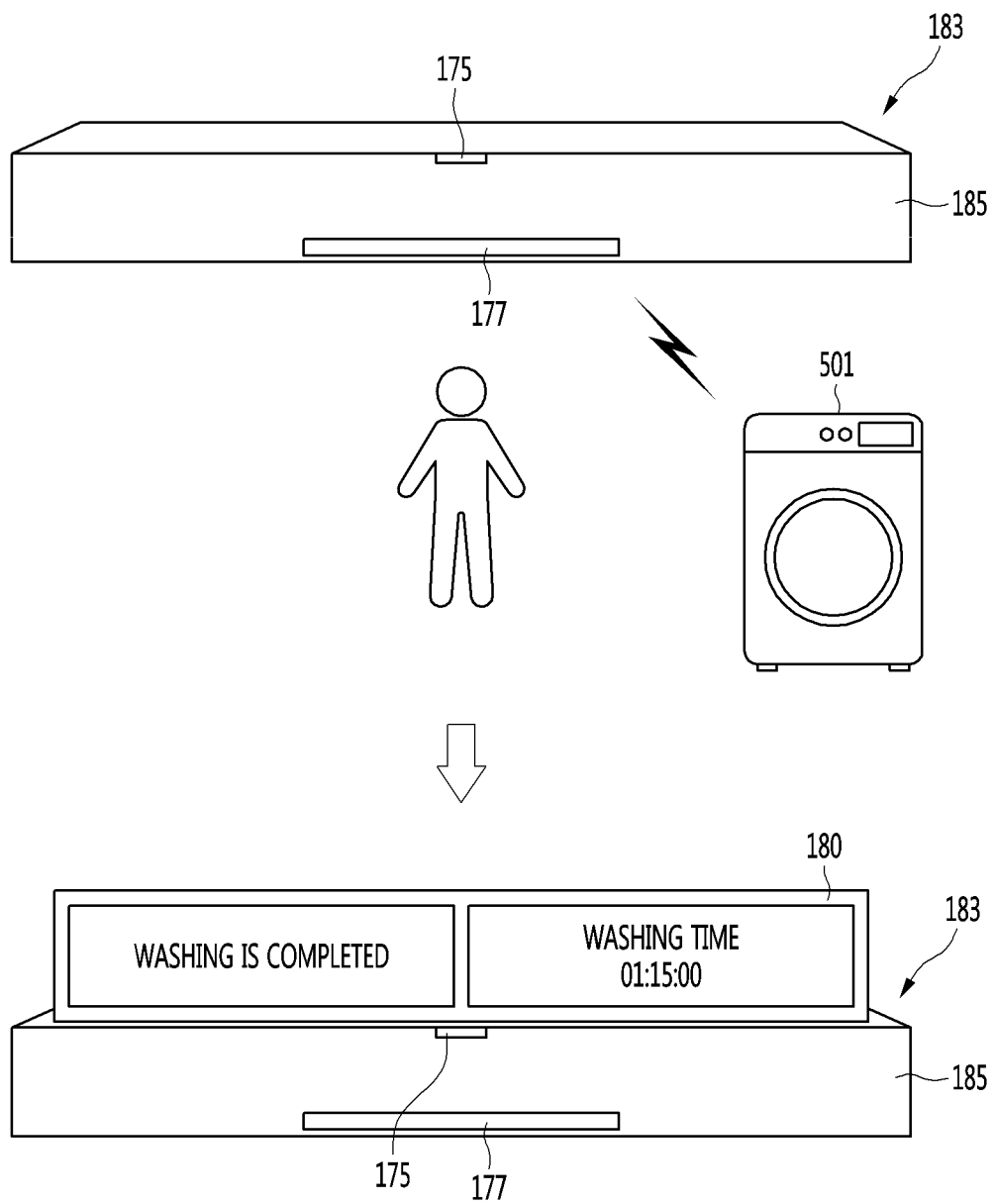
FIG. 18 is a view illustrating a method of displaying an event of a home appliance by a display device according to an embodiment of the present disclosure.

In particular, FIG. 18 is a view illustrating a method of displaying an event of a home appliance by a display device according to an embodiment of the present disclosure. When a user's motion is detected and an external device connected to the same AP to which the wireless communication unit 173 is connected is recognized, the controller 170 can detect the occurrence of an event of at least one home appliance 501 connected to the display device 100. For example, the event occurrence can include washing completion, drying completion, cooking completion, dish washing completion, error occurrence, and the like.

In this instance, the controller 170 can switch the display 180 from the zero view mode to the partial view mode or the full view mode, and display event information through the display 180. The event information can be information related to an event occurring in the home appliance 501. According to the example of FIG. 18, the event information can be a laundry completion guide message and a washing time but this is merely an example and the present disclosure is not limited thereto.

According to the second embodiment, the preset operating condition can be an operation of a home appliance connected to the display device 100. Similarly, in this instance, the home appliance can include at least one home appliance connected to the same AP to which the display device 100 is connected. Alternatively, the home appliance can be a home appliance registered in the display device 100. For example, when there are a plurality of home appliances connected to the same AP to which the display device 100 is connected, the controller 170 can determine that an event occurs when an operation is started for each of the plurality of home appliances.

Therefore, when a user's motion is detected and a home appliance connected to the same AP to which the wireless communication unit 173 is connected is recognized, if the home appliance connected to the display device 100 operates, the controller 170 can switch the display device 100 from the zero view mode to the partial view mode or the full view mode and controls the display 180 to display operation information of the home appliance.

Figure 19:
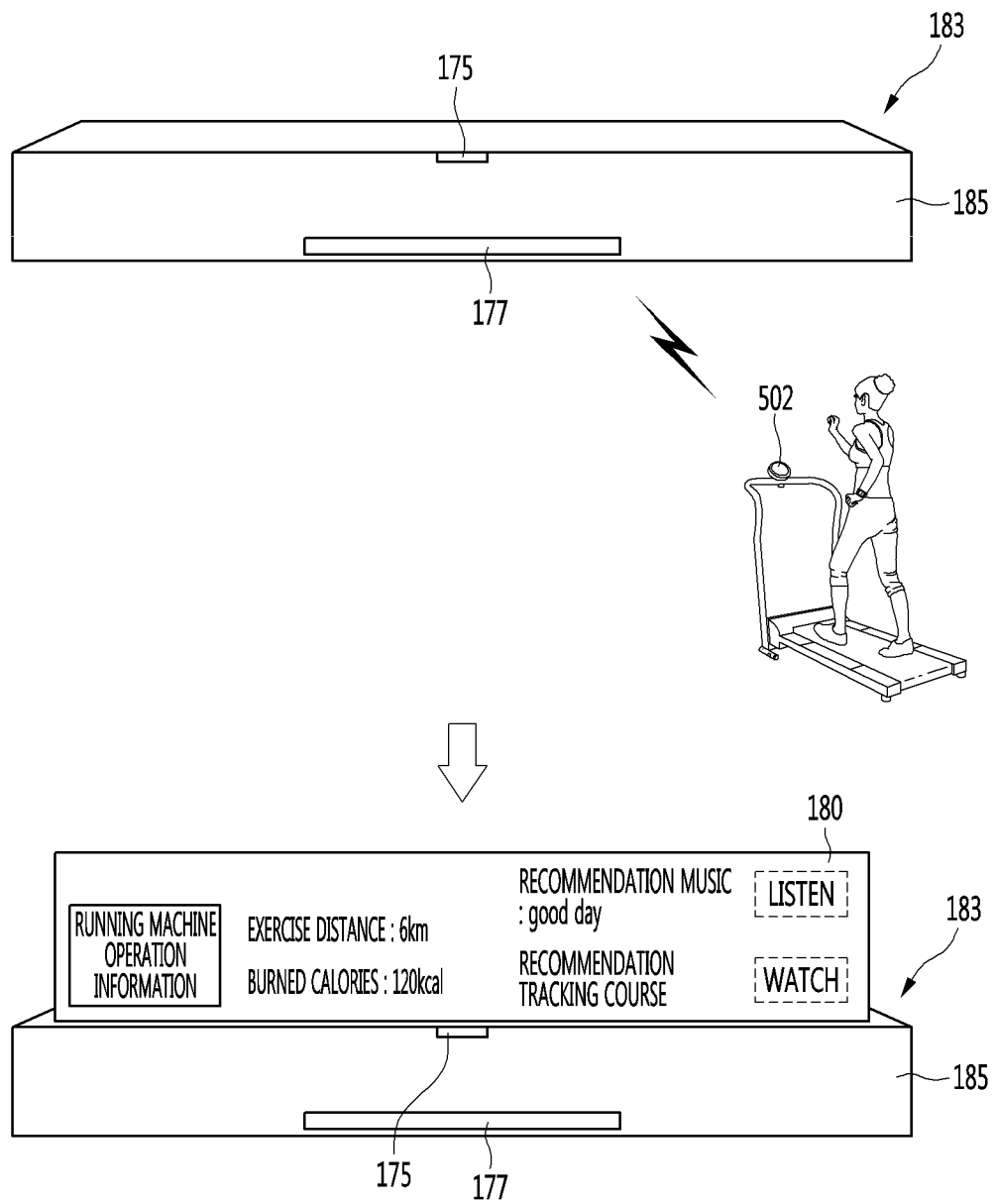
FIG. 19 is a view illustrating a method of displaying operation information of an external device by a display device according to an embodiment of the present disclosure.

Next, FIG. 19 is a view illustrating a method of displaying operation information of an external device by a display device according to an embodiment of the present disclosure. When a user's motion is detected and an external device connected to the same AP to which the wireless communication unit 173 is connected is recognized, the controller 170 can detect whether at least one home appliance 502 connected to the display device 100 operates. When it is detected that the home appliance 502 operates, the controller 170 can determine that the preset operating condition is satisfied.

In this instance, the controller 170 can switch the display 180 from the zero view mode to the partial view mode or the full view mode and display operation information of the home appliance through the display 180. The operation information of the home appliance can be information related to an operation state of the home appliance 502. According to the example of FIG. 19, when the home appliance 502 is exercise equipment, information related to the operation state of the home appliance 502 can include an exercise distance, a target exercise amount, burned calories, recommended music during exercise, a recommended tracking course, and the like. In addition, the controller 170 controls the display 180 to display a screen of a famous tracking course in a first-person view in the full view mode when a view command of the recommended tracking course is received. In this instance, the user can feel as if he actually runs.

According to the third embodiment, the preset operating condition can be an initial detection of a user's motion after a preset time. For example, when a user's motion is first detected after the lapse of a specific time, the controller 170 can determine that the user's motion corresponds to the preset operating condition. Therefore, when the user's motion is first detected after the preset specific time in a state where an external device connected to the same AP to which the wireless communication unit 173 is connected is recognized, the controller 170 can switch the display 180 from the zero view mode to the partial view mode or the full view mode and control the display 180 to display preset information.

Figure 20:
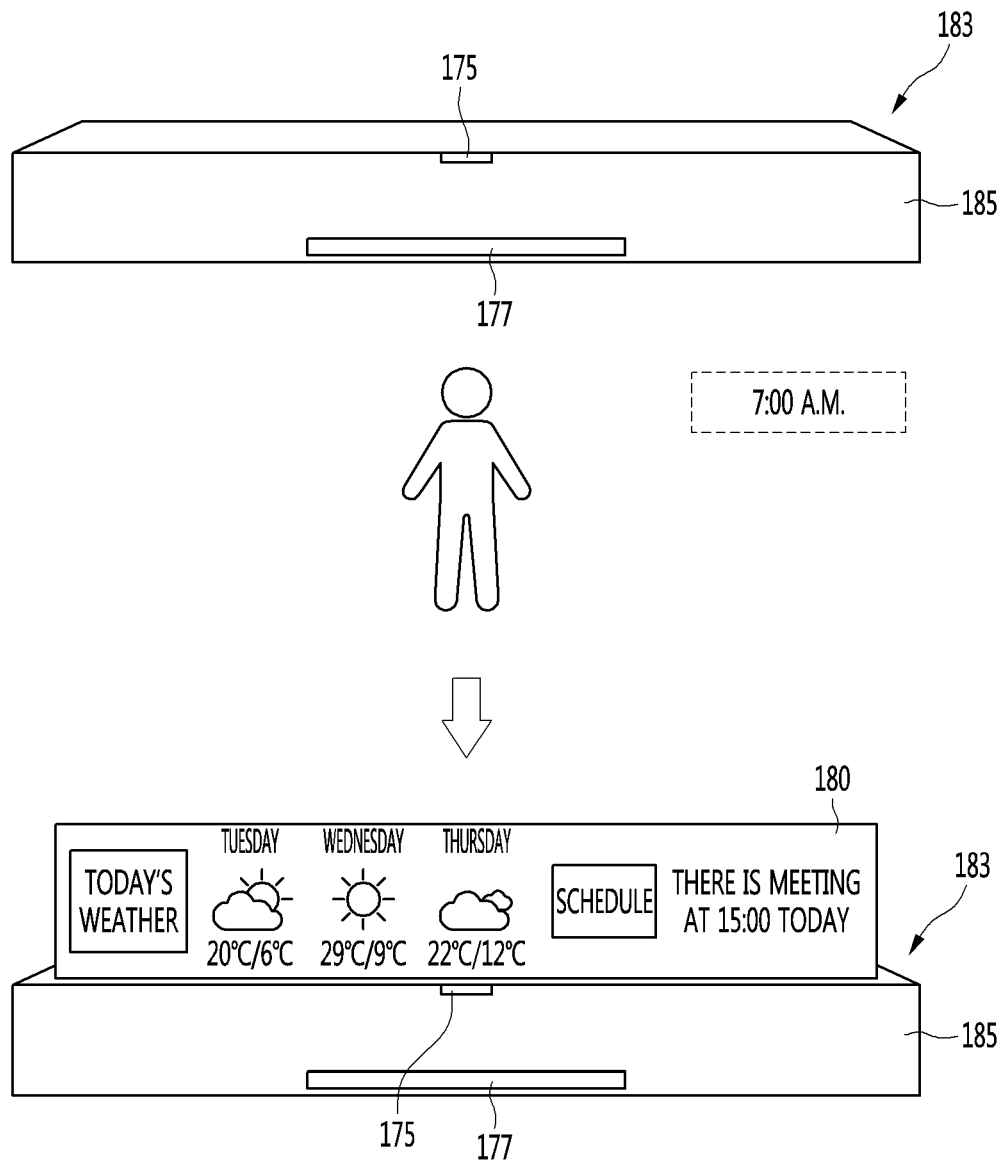
FIG. 20 is a view illustrating a method of displaying preset information by a display device according to an embodiment of the present disclosure.

Next, FIG. 20 is a view illustrating a method of displaying preset information by a display device according to an embodiment of the present disclosure. When a user's motion is detected and an external device connected to the same AP to which the wireless communication unit 173 is connected is recognized, if the user's motion is first detected after the preset time, the controller 170 can determine that the a preset operating condition is satisfied. The preset time can be set as a default or can be set according to a user input. For example, the preset time can be 7:00 a.m., but this is merely an example and is not limited thereto.

If the user's motion is first detected after the preset time, the controller 170 can display preset information. The preset information can vary according to the preset time. For example, when the preset time is a morning time zone, the preset information can include today's weather information, today's schedule information, and the like, but this is merely an example and the present invention is not limited thereto.

According to a fourth embodiment, the preset operating condition can be an environmental condition. In particular, the controller 170 can receive environment information from a sensor provided in at least one home appliance or an external server. If the environment information satisfies the preset environmental condition, the controller 170 can determine that the preset operating condition is satisfied.

Therefore, when the user's motion is detected and in a state where the external device connected to the same AP to which the wireless communication unit 173 is connected is recognized, if the environment information satisfies the preset environmental condition, the controller 170 can switch from the zero view mode to the partial view mode or the full view mode and control the display 180 to display the environment information and information suggesting an operation of the home appliance according to the environment information.

Figure 21:
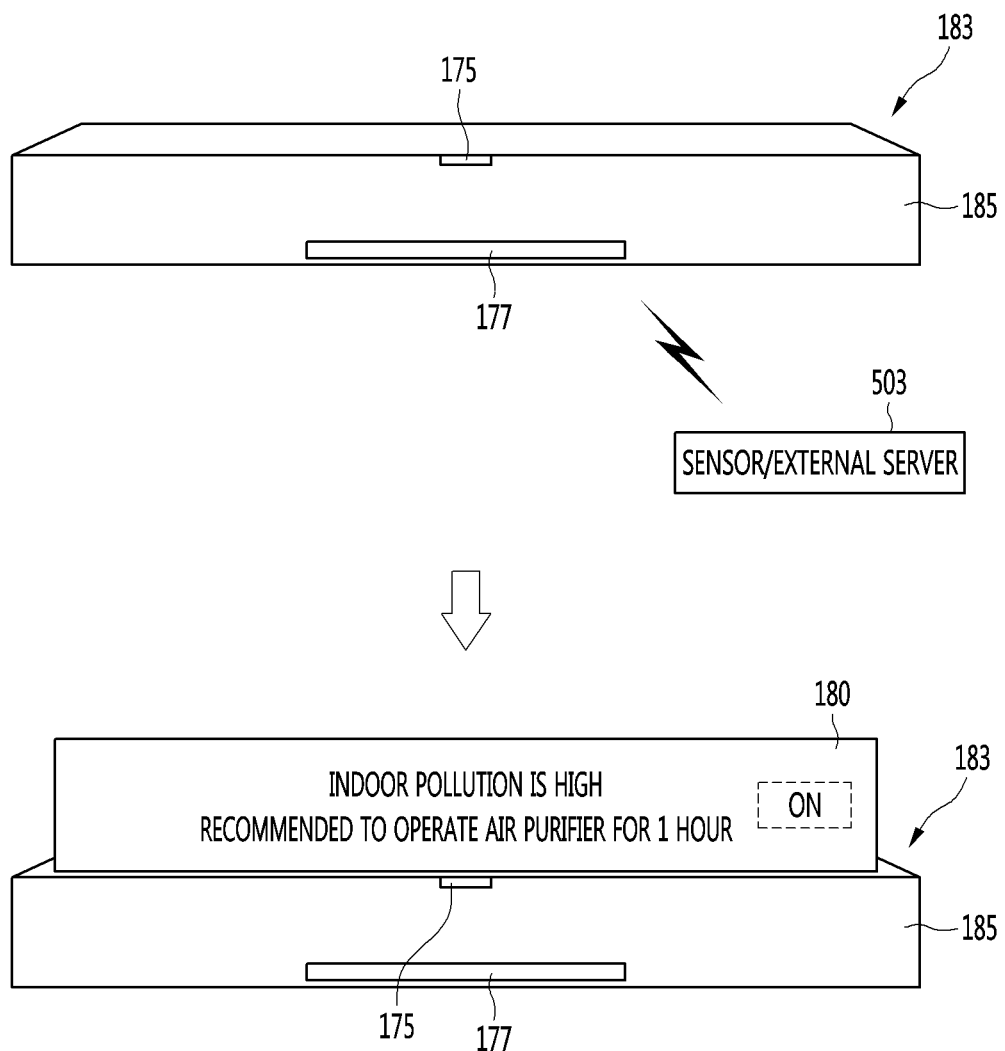
FIG. 21 is a view illustrating a method of displaying environment information or information suggesting an operation of a home appliance according to the environment information by a display device according to an embodiment of the present disclosure.

Next, FIG. 21 is a view illustrating a method of displaying environment information or information suggesting an operation of a home appliance according to the environment information by a display device according to an embodiment of the present disclosure. When the user's motion is detected and the external device connected to the same AP to which the wireless communication unit 173 is connected is recognized, if the environment information satisfies the preset environmental condition, the controller 170 can determine that the preset operating condition is satisfied. For example, if a concentration of dust according to the environment information is a reference concentration or greater, the controller 170 can determine that the preset environmental condition is satisfied, but this is merely an example and the present disclosure is not limited thereto.

When the environment information satisfies the preset environmental condition, the controller 170 can switch the display 180 from the zero view mode to the partial view mode or the full view mode and control the display 180 to display the environment information and information suggesting the operation of the home appliance according to the environment information.

As illustrated in the example of FIG. 21, the display 180 can display the environment information, the information suggesting an operation of the home appliance according to the environment information, and an operation icon, and the controller 170 can transmit a control signal for operating the home appliance according to the suggestion information to the home appliance according to a selection command of the operation icon.

As described above through the first to fourth embodiments, according to various embodiments of the present disclosure, the display device 100 can advantageously provide the user with various information required by the user when the user is near. In addition, the above embodiments are merely examples and the present disclosure is not limited thereto.

Further, after the controller 170 detects a user's motion, there can be a plurality of external devices connected to the same AP to which the wireless communication unit 173 is connected. According to an embodiment of the present disclosure, when there are a plurality of external devices recognized as being connected to the same AP to which the wireless communication unit 173 is connected, the controller 170 can set each of the plurality of external devices to an external device capable of operating the display device 100. According to another embodiment of the present disclosure, when there are a plurality of external devices recognized as being connected to the same AP to which the wireless communication unit 173 is connected, the controller 170 can set one of the plurality of external devices to an external device capable of operating the display device 100. For example, the controller 170 can set an external device closest to the display device 100 among the plurality of external devices recognized as being connected to the same AP to an external device capable of operating the display device 100.

Figure 22:
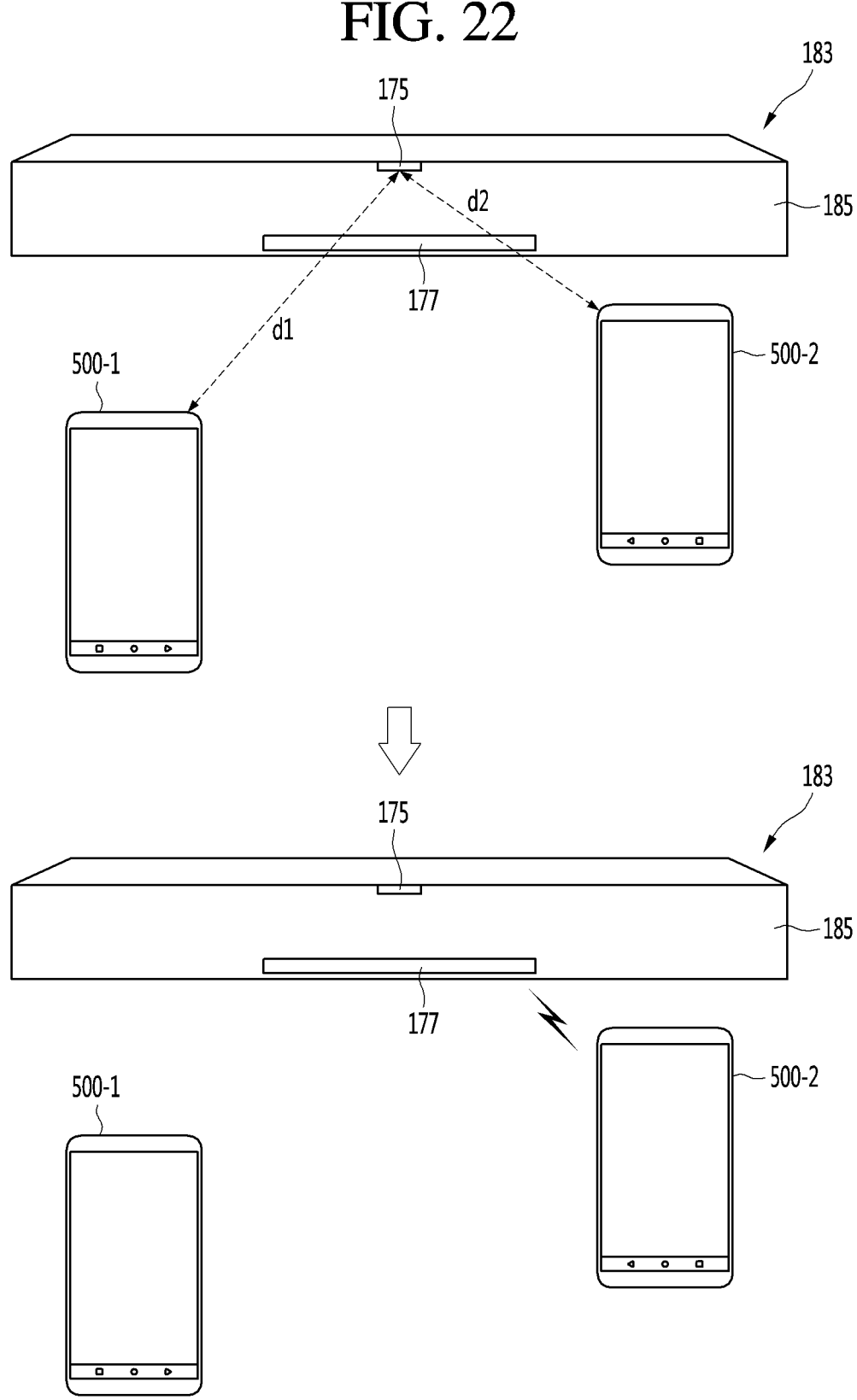
FIG. 22 is a view illustrating a method of setting an external device closest to a display device according to the present disclosure to an external device capable of operating the display device.

In particular, FIG. 22 is a view illustrating a method of setting an external device closest to a display device according to the present disclosure to an external device capable of operating the display device. When there are a plurality of external devices 500-1 and 500-2 recognized as being connected to the same AP to which the wireless communication unit 173 is connected, the controller 170 can calculate distances between each of the plurality of external devices 500-1 and 500-2 and the display device 100.

In addition, the controller 170 can calculate distances between the display device 100 and each of the plurality of external devices 500-1 and 500-2 based on a magnitude of a signal for each of the plurality of external devices 500-1 and 500-2. According to the example of FIG. 22, the controller 170 can calculate the distance to the first external device 500-1 as a distance d1 and the distance to the second external device 500-2 as a second distance d2 shorter than the first distance d1.

In this instance, the controller 170 can set the second external device 500-2 positioned closer to the display device 100 than the first external device 500-1 to an external device capable of operating the display device 100. As such, when the controller 170 sets the second external device 500-2 as an external device capable of operating the display device 100, the controller 170 can be operated only by a control signal received from the second external device 500-2 and can disregard a control signal received from the first external device 500-1.

As described above, by setting the external device close to the display device 100 as an external device capable of operating the display device, there is an advantage of minimizing a case where the display device 100 is actually operated by a user who does not intend to. Also, when outputting the alarm, the controller 170 can adjust a magnitude of the alarm according to the user location. In more detail, the controller 170 can adjust the magnitude of the alarm according to the distance to the user whose motion is detected.

Here, adjusting the magnitude of the alarm can refer to adjusting the magnitude of the alarm sound output from the audio output unit 185 or adjusting brightness of light emitted from the light emitter 177. That is, increasing the magnitude of the alarm can refer to increasing the magnitude of the alarm sound output from the audio output unit 185 or adjusting brightness of light emitted from the light emitter 177, and decreasing the magnitude of the alarm can refer to decreasing the magnitude of the alarm sound output from the audio output unit 185 or decreasing brightness of light emitted from the light emitter 177.

FIG. 23 is a view illustrating a method of adjusting a magnitude of an alarm according to a distance to a user by a display device according to the present disclosure. If an alarm output condition is satisfied, the controller 170 can calculate a distance to the user before outputting the alarm.

According to an embodiment, the controller 170 can control the motion recognition sensor 175 to calculate a distance to the user. In particular, the motion recognition sensor 175 can calculate a distance to the user through electromagnetic waves reflected after radiating the electromagnetic waves toward the user whose motion is detected. The controller 170 can adjust a magnitude of the alarm according to the distance to the user.

According to an embodiment of the present disclosure, the controller 170 outputs a small alarm when the distance d1 to the user is less than or equal to a preset reference distance as shown in (a) of FIG. 23, and the controller 170 outputs a large alarm if the distance d2 to the user is greater than or equal to the preset reference distance, the alarm can be output large as shown in (b) of FIG. 23.

According to another embodiment, the controller 170 can previously set the magnitude of alarm for a specific distance, decreases the magnitude of the alarm to be output as the user is located shorter than the specific distance, and increases the magnitude of the alarm to be output as the user is located longer than the specific distance.

Thus, by adjusting the magnitude of the alarm according to the distance to the user, the alarm can be advantageously output to the user with an appropriate magnitude. Specifically, when the user is too close to the display device 100, the magnitude of the alarm can be reduced to protect the user's ear, and when the user is located too far, the magnitude of the alarm can be increased to minimize a case where the user does not hear the alarm.

So far, various methods in which the controller provides advantageous information to the user as the user's motion is detected has been described. Conversely, if the user's motion is not detected, the controller 170 can control the display device 100 to be powered off.

Figure 24:
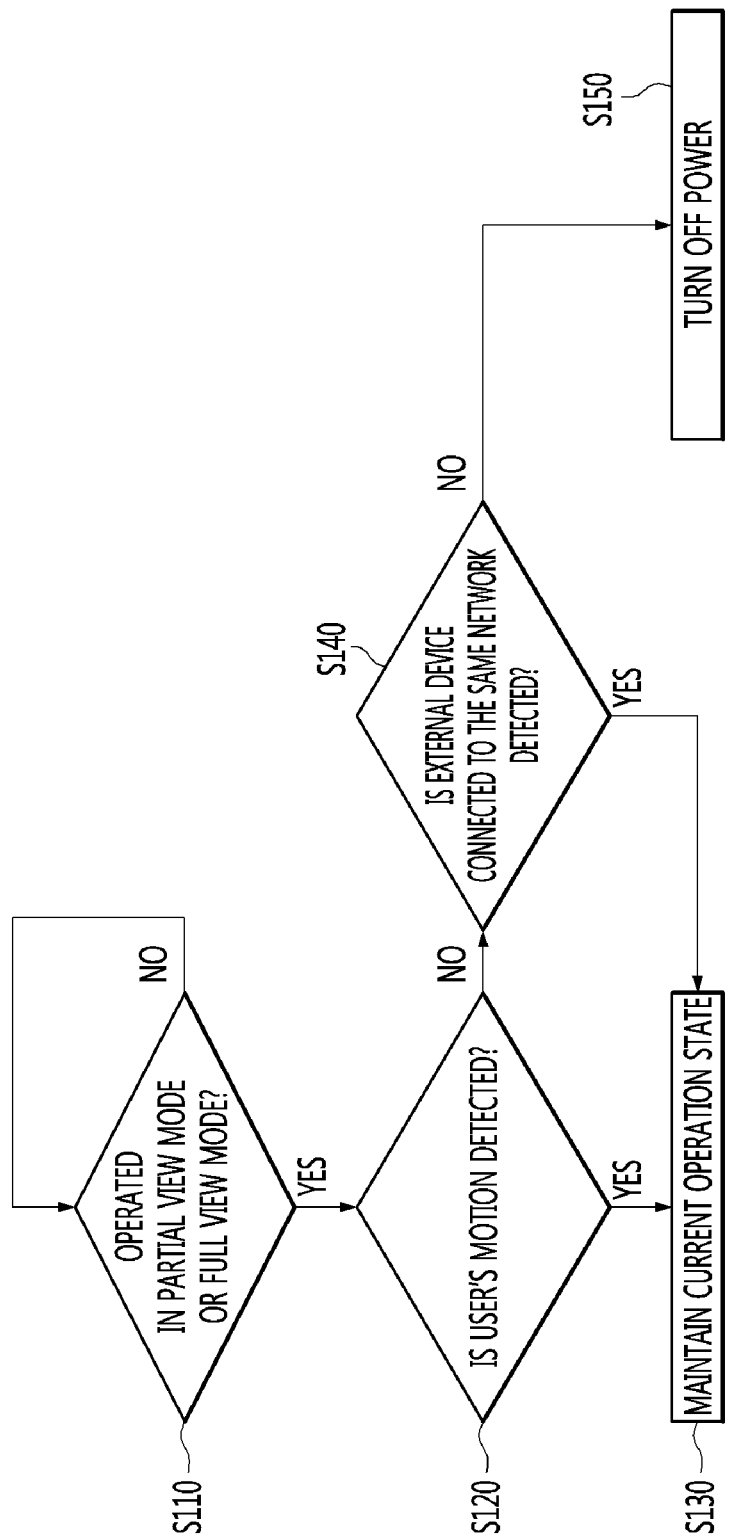
FIG. 24 is a flowchart illustrating a method of operating a display device according to another embodiment of the present disclosure.

Next, FIG. 24 is a flowchart illustrating a method of operating a display device according to another embodiment of the present disclosure. In particular, the controller 170 can determine whether the display is in the partial view mode or the full view mode (S110). The controller 170 can also detect a user's motion when the display is in the partial view mode or the full view mode (S120).

In addition, the controller 170 can detect the user's motion through the motion recognition sensor 175. Since the method of detecting the user's motion is the same as that described above with reference to FIG. 10, a redundant description thereof will be omitted.

When detecting the user's motion (Yes in S120), the controller 170 can maintain a current operating state (S130). This is because the user is predicted to be viewing the display device 100. That is, when the user's motion is detected, the controller 170 can maintain the current operating state, thereby minimizing disturbance to the user viewing.

In addition, if a user's motion is not detected (No in S120), the controller 170 can detect an external device connected to the same network (S140). If an external device connected to the same network is detected (Yes in S140), the controller 170 can maintain the current operating state (S130). This is because the user is expected to be in a space where the display device 100 is installed. Therefore, when the display device 100 is arbitrarily operated regardless of the user's intention can be minimized.

Also, if a user's motion is not detected and an external device connected to the same network is not detected (no in S120 and S140), the controller 170 can control the power to be turned off (S150). In summary, the controller 170 can turn off the power if a user's motion is not detected in a state where the display 180 operates in the partial view mode or the full view mode and if disconnection of the external device connected to the same AP to which the wireless communication unit 173 is connected is detected.

This is because it is predicted that the user does not exist in the space where the display device 100 is installed. That is, since the user is predicted not to view the display device 100 operating in the partial view mode or the full view mode, the controller 170 can minimize unnecessary power consumption by turning off the display device 100.

In addition, it is merely illustrative to separately describe each of the embodiments, and each embodiment can be implemented in combination. For example, the display device 100 that performs all the embodiments described in FIGS. 9, 14, and 21 is also included in the scope of the present disclosure. That is, each embodiment is merely divided for convenience of description, which does not mean that the embodiments disclosed herein are to be performed individually.

The above description is merely illustrative of the technical idea of the present disclosure, and various modifications and changes may be made thereto by those skilled in the art without departing from the essential characteristics of the present disclosure. Therefore, the embodiments of the present disclosure are not intended to limit the technical spirit of the present disclosure but to illustrate the technical idea of the present disclosure, and the technical spirit of the present disclosure is not limited by these embodiments.

The scope of protection of the present disclosure should be interpreted by the appending claims, and all technical ideas within the scope of equivalents should be construed as falling within the scope of the present disclosure.

What is claimed is:

1. A display device comprising:
  a housing;
  a rollable display included in the housing;
  a wireless communication unit connected to an access point (AP);
  a motion recognition sensor configured to detect a user's motion; and
  a controller configured to:
  determine if an external device is connected to the AP to which the wireless communication unit is connected, and
  output an alarm in response to the detection of the user's motion and the determination the external device is connected to the AP,
  wherein the controller is further configured to:
  in response to the detection of the user's motion and the determination the external device is connected to the AP, draw out the rollable display from the housing and display, on an extended area of the rollable display, operation information of the external device, and
  transmit a control signal to the external device to display information for operating the display device through the external device when outputting the alarm.

2. The display device of claim 1, wherein the rollable display is configured to be in a zero view mode in which the rollable display is fully retracted into the housing, a partial view mode in which the rollable display is partially drawn out from the housing, and a full view mode in which the rollable display is drawn out from the housing to display a full view.

3. The display device of claim 2, wherein the controller is further configured to output the alarm in response to the detection of the user's motion, the determination the external device is connected to the AP, and the rollable display is in the zero view mode.

4. The display device of claim 1, wherein the controller is further configured to determine if the external device is connected to the AP in response to the detection of the user's motion.

5. The display device of claim 1, wherein the controller is further configured to output the alarm according to a presence of the recognized external device when the user's motion is detected.

6. The display device of claim 1, wherein the controller is further configured to output the alarm only when the external device is an external device registered with the display device.

7. The display device of claim 1, wherein the controller is further configured to output the alarm only when the rollable display is fully retracted into the housing.

8. The display device of claim 1, wherein the controller is further configured to output the alarm by driving at least one of a speaker and a light emitter.

9. The display device of claim 1, wherein the controller is further configured to limit a maximum number of times to output the alarm for a preset time with respect to a time at which the alarm is last output or with respect to a predetermined time.

10. The display device of claim 1, wherein the controller is further configured to:
in response to an occurrence of an event on the external device connected to the AP, draw out the rollable display from the housing and display event information about the occurrence of the event.

11. The display device of claim 1, wherein the controller is further configured to draw out the display from the housing and display preset information when the user's motion is first detected after a specific time.

12. The display device of claim 1, wherein the controller is further configured to draw out the display from the housing and display environment information and information suggesting an operation of the external device according to the environment information, when the user's motion is detected.

13. The display device of claim 1, wherein the controller is further configured to turn on power of a set-top box (STB) connected to the display device, in response to the output of the alarm.

14. The display device of claim 1, wherein the controller is further configured to set an external device closest to the display device, among a plurality of external devices, to an external device capable of operating the display device when the plurality of external devices are determined as being connected to the AP.

15. The display device of claim 1, wherein the controller is further configured not to output the alarm when the user's motion is re-detected and the external device again determined as being connected to the AP within a predetermined time after the alarm is output.

16. The display device of claim 1, wherein the controller is further configured to adjust a magnitude of the alarm according to a distance to a user whose motion is detected.

17. The display device of claim 1, wherein the controller is further configured to output the alarm when the external device is re-connected after having been connected to the AP.

18. The display device of claim 1, wherein the controller is configured to turn off power of the rollable display when the user's motion is not detected and the external device is disconnected from the AP, when power of the display is turned on.

* * * * *